US012762433B2

(12) United States Patent
Hong et al.

(10) Patent No.: US 12,762,433 B2
(45) Date of Patent: Oct. 13, 2026

(54) SYSTEM AND METHOD FOR PREDICTING PROCESS CHANGES BY USING KEY FACTORS IN COMMERCIAL CHEMICAL PROCESS

(71) Applicant: SK GAS CO., LTD., Seongnam-si (KR)

(72) Inventors: Ung Gi Hong, Seongnam-si (KR); Sung Joo Yeo, Seongnam-si (KR); Seung Hwan Kong, Seongnam-si (KR); Min Ho Kim, Seongnam-si (KR); Hae Bin Shin, Seongnam-si (KR); Hee Dong Choi, Seongnam-si (KR); Young Gook Kye, Seongnam-si (KR)

(73) Assignee: SK GAS CO., LTD., Seongnam-si (KR)

( * ) Notice: Subject to any disclaimer, the term of this patent is extended or adjusted under 35 U.S.C. 154(b) by 597 days.

(21) Appl. No.: 18/275,709

(22) PCT Filed: Apr. 27, 2022

(86) PCT No.: PCT/KR2022/005974
§ 371 (c)(1),
(2) Date: Aug. 3, 2023

(87) PCT Pub. No.: WO2022/231283
PCT Pub. Date: Nov. 3, 2022

(65) Prior Publication Data

US 2024/0095548 A1 Mar. 21, 2024

(30) Foreign Application Priority Data

Apr. 28, 2021 (KR) ........................ 10-2021-0055081

(51) Int. Cl.
*G06N 5/022* (2023.01)

(52) U.S. Cl.
CPC .................................... *G06N 5/022* (2013.01)

(58) Field of Classification Search
CPC ...... G06N 5/022; G06N 3/0442; G06N 3/045; G06N 20/00; G05B 23/0221;
(Continued)

(56) References Cited

U.S. PATENT DOCUMENTS 10,510,002 B1 * 12/2019 Olabiyi .................... G06N 3/08
12,493,839 B2 * 12/2025 Hong ..................... G05B 13/02
(Continued)

FOREIGN PATENT DOCUMENTS

JP 2003-058206 A 2/2003
JP 2020-166749 A 10/2020
(Continued)

OTHER PUBLICATIONS

International Search Report for PCT/KR2022/005974 mailed Aug. 17, 2022 from Korean Intellectual Property Office.

*Primary Examiner* — Ryan Barrett
(74) *Attorney, Agent, or Firm* — Paratus Law Group, PLLC

(57) ABSTRACT

A system for predicting process changes by using key factors in a commercial chemical process, includes: a key factor extraction and individual tag importance backup unit that extracts yield key factors by calculating the importance of each tag, and backs up importance data for each tag; and a yield prediction model training and yield prediction performing unit that performs yield prediction model training by using the importance of each tag accumulated in the key factor extraction and individual tag importance backup unit, and performs yield prediction so as to output a yield prediction result, evaluates performance, and selects an optimal prediction model.

18 Claims, 22 Drawing Sheets

(58) Field of Classification Search
CPC ............ G05B 23/0283; G05B 23/0275; G05B 19/4183; Y02P 90/30
See application file for complete search history.

(56) References Cited

U.S. PATENT DOCUMENTS

| | | | | |
|---|---|---|---|---|
| 2006/0074599 | A1* | 4/2006 | Emigholz | C10G 11/187 702/185 |
| 2010/0179930 | A1* | 7/2010 | Teller | G06N 20/00 706/12 |
| 2016/0224705 | A1* | 8/2016 | Joshi | G06F 30/20 |
| 2017/0124487 | A1* | 5/2017 | Szeto | G06F 11/1448 |
| 2018/0330250 | A1* | 11/2018 | Nakayama | G05B 23/0208 |
| 2018/0349520 | A1* | 12/2018 | Bhalla | G06Q 10/0631 |
| 2020/0064324 | A1 | 2/2020 | Su et al. | |
| 2020/0074303 | A1* | 3/2020 | Chu | C12Q 1/686 |
| 2020/0097810 | A1* | 3/2020 | Hetherington | G06N 3/09 |
| 2020/0202127 | A1* | 6/2020 | Chen | G06Q 10/04 |
| 2020/0242483 | A1* | 7/2020 | Shashikant Rao | G06F 16/285 |
| 2020/0320392 | A1* | 10/2020 | Lin | G06N 3/08 |
| 2020/0342226 | A1* | 10/2020 | Bengtson | G06N 3/09 |
| 2021/0026446 | A1* | 1/2021 | Liu | G06N 3/082 |
| 2021/0034023 | A1* | 2/2021 | Keenan | G05B 13/0265 |
| 2021/0042297 | A1* | 2/2021 | Urbanke | G06N 5/01 |
| 2021/0065851 | A1* | 3/2021 | Madrid | G06N 20/00 |
| 2021/0117861 | A1* | 4/2021 | Burch | G06F 18/2113 |
| 2021/0286347 | A1* | 9/2021 | Schulz | G05B 13/04 |
| 2021/0358571 | A1* | 11/2021 | Islam | G16H 50/20 |
| 2021/0360070 | A1* | 11/2021 | Cella | G05B 19/042 |
| 2021/0374161 | A1* | 12/2021 | Marvaniya | A01B 79/005 |
| 2022/0067614 | A1* | 3/2022 | Guan | G06Q 10/06315 |
| 2022/0143569 | A1* | 5/2022 | Holzmeister | B01J 19/0033 |
| 2022/0155298 | A1* | 5/2022 | Heilmann | G16B 50/10 |
| 2022/0261928 | A1* | 8/2022 | Malizia | G06N 20/20 |
| 2022/0309393 | A1* | 9/2022 | Liu | G06Q 10/04 |
| 2022/0328128 | A1* | 10/2022 | Kok | G06N 20/00 |
| 2022/0335271 | A1* | 10/2022 | Paul | G06N 3/08 |
| 2024/0104464 | A1* | 3/2024 | Hong | G05B 13/02 |

FOREIGN PATENT DOCUMENTS

| | | | |
|---|---|---|---|
| KR | 10-2008-0105439 | A | 12/2008 |
| KR | 10-1508641 | B1 | 4/2015 |
| KR | 10-2019-0098484 | A | 8/2019 |
| KR | 10-2036956 | B1 | 10/2019 |
| KR | 10-2019-0135445 | A | 12/2019 |

* cited by examiner

FIG. 7

| Classification | Formula | Python Code |
|---|---|---|
| RMSE: Square root of average of squared errors between actual values and predicted values | $RMSE = \sqrt{\frac{1}{n}\sum_{i=1}^{n}(y_i - \hat{y}_i)^2}$ | `from sklearn.metrics import mean_squared_error`<br>`yPredict = Values predicted by model`<br>`yTrue = Actual values from model`<br>`rmse = mean_squared_error(y_pred=yPredict, y_true=yTrue) ** 0.5` |
| MAPE: Average of percentage errors between actual values and predicted values | $MAPE = \frac{100}{n}\sum_{i=0}^{n}\left\lvert\frac{(y_i - \hat{y}_i)}{\hat{y}_i}\right\rvert$ | `import numpy as np`<br>`yPredict = Values predicted by model`<br>`yTrue = Actual values from model`<br>`mape = np.mean(np.abs((yTrue - yPredict) / yTrue)) * 100` |
| MAE: Average of absolute errors between actual values and predicted values | $MAE = \frac{1}{n}\sum_{i=0}^{n}\lvert y_i - \hat{y}_i\rvert$ | `import numpy as np`<br>`yPredict = Values predicted by model`<br>`yTrue = Actual values from model`<br>`mae = np.mean(np.abs((yTrue - yPredict)))` |

SYSTEM AND METHOD FOR PREDICTING PROCESS CHANGES BY USING KEY FACTORS IN COMMERCIAL CHEMICAL PROCESS

CROSS-REFERENCE TO PRIOR APPLICATIONS

This application is a National Stage Patent Application of PCT International Application No. PCT/KR2022/005974 (filed on Apr. 27, 2022), which claims priority to Korean Patent Application No. 10-2021-0055081 (filed on Apr. 28, 2021), which are all hereby incorporated by reference in their entirety.

BACKGROUND

The present disclosure relates to process change prediction, and more particularly, to a system and method for predicting catalytic activity by using key factors in a commercial chemical process, wherein key factors are selected according to process operating conditions and applied to a prediction model so that the prediction accuracy of a change in catalytic activity can be increased.

In performing a series of processes comprised of many steps, integrity assurance and reliability are very important for organically linking every process. To achieve such integrity, the processes require the development of an efficient process management system that enables to detect any glitch in each process from input values of main facilities and diagnose the cause.

Generally, most of past data generated in an industrial process often has few variables and a linear data structure, which makes it possible to obtain enough prediction/classification results by an existing algorithm alone.

However, because of the development of ICT and sensor technology, data with several hundred or thousand variables have begun to be generated in manufacturing processes or in the fields of genetic engineering.

In particular, in contemporary industrial processes such as chemical and manufacturing processes and power plants, the scale of data is getting bigger and more complex over time, since various efforts are being made to meet safety, health, and environment-related regulations and maximize profits.

Thus, it is very critical to select and manage data that has a large effect on the creation of profits from among an enormous amount of complex data.

For example, a process operation condition in a commercial chemical process has short-term and long-term effects on catalytic activity, and the catalytic activity is directly linked to production yield. Thus, it is very important to predict catalytic activity from a short-term and long-term perspective.

From a short-term perspective, it is necessary to increase production yield by detecting a change in catalytic activity according to a process operation condition and improving catalytic activity through the optimization of the operation condition.

From a long-term perspective, in a commercial chemical process using a catalyst, the catalyst becomes deactivated with progression of the process operation, thus resulting in a decrease in activity, which requires replacement after a certain period of time. Such a catalyst replacement costs a lot of time and money, and therefore it is important to predict future catalytic activity and determine the catalyst lifetime and when to replace it.

Accordingly, it is necessary to develop a new technology that can increase the prediction accuracy of catalytic reaction activity by finding process operating conditions (key factors) largely affecting catalytic activity and reflecting them.

(Patent Document 1) Korean Laid-Open Patent No. 10-2036956

(Patent Document 2) Korean Laid-Open Patent No. 10-1508641

(Patent Document 3) Korean Laid-Open Patent No. 10-2019-0098484.

SUMMARY

The present disclosure has been made in an effort to solve the problems of process change prediction technologies in the conventional art, and an aspect of the present disclosure is to provide a system and method for predicting catalytic activity by using key factors in a commercial chemical process, wherein key factors are selected according to process operating conditions and applied to a prediction model so that the prediction accuracy of a change in catalytic activity can be increased.

An aspect of the present disclosure is to provide a system and method for predicting catalytic activity by using key factors in a commercial chemical process, which help efficiently manage the time and cost of product production and catalyst replacement by allowing to determine a product sales plan and when to replace the catalyst through accurate catalytic activity prediction.

An aspect of the present disclosure is to provide a system and method for predicting catalytic activity by using key factors in a commercial chemical process, which can increase product yield by detecting a change in catalytic activity according to a process operation condition and improving catalytic activity through the optimization of the operation condition.

The aspects of the present disclosure are not limited to the foregoing, and other aspects not mentioned herein will be able to be clearly understood by those skilled in the art from the following description.

To accomplish the above aspects, a system for predicting catalytic activity by using key factors in a commercial chemical process according to the present disclosure includes: a key factor extraction and individual tag importance backup unit that extracts yield key factors by calculating the importance of each tag, and backs up importance data for each tag; and a yield prediction model training and yield prediction performing unit that performs yield prediction model training by using the importance of each tag accumulated in the key factor extraction and individual tag importance backup unit, and performs yield prediction so as to output a yield prediction result, evaluates performance, and selects an optimal prediction model.

Here, the yield prediction model training and yield prediction performing unit includes: an importance calculation unit that calculates the importance of each tag/unit/section from the importance data backed up in the key factor extraction and individual tag importance backup unit; a yield prediction model training unit that performs yield prediction model training by using the calculated importance of each tag; a yield prediction performing unit that performs yield prediction through a yield prediction model trained in the yield prediction model training unit so as to output a yield prediction result; and a performance evaluation and optimal model selection unit that evaluates the performance of the yield prediction model and selects an optimal prediction model, by using the yield prediction result.

Furthermore, the key factor extraction and individual tag importance backup unit includes: a data extraction unit that extracts tag data in units of a set period; an outlier discrimination unit that discriminates and aggregates outliers by tag by using an outlier extraction reference master; an outlier processing unit that generates an input mart draft excluding the outliers; a derived variable generation unit that generates derived variables for each tag, and generates an advanced input mart having the derived variable added thereto; a yield calculation unit that backs up the result of calculation of a yield by realizing a target value via exclusion and correction of the outliers; and a key factor extraction unit that extracts a yield key factor by calculating importance of each tag, and backs up importance data for each tag.

Furthermore, data to be inputted into the data extraction unit includes: plant process operation data in an olefin production process, including data for each section, each unit, and each tag; laboratory data including LIMS (Laboratory Information Management System) data, plant event master data including a shut-down history, long integers/short integers, etc.; and past yield data including conversion rates and selectivity.

Furthermore, the plant process operation data in the olefin production process is sensor data including temperature, pressure, flow, and composition data, and past data accumulated continuously over a unit period of time.

Furthermore, the outlier extraction reference master which is used for the outlier discrimination unit to discriminate and aggregate outliers for each tag continuously updates reference values for extracting outliers over time in consistency with the concept of a machine learning-based system.

To accomplish other aspects, a method for predicting catalytic activity by using key factors in a commercial chemical process according to the present disclosure includes: a key factor extraction and individual tag importance backup step of extracting yield key factors by calculating the importance of each tag, and backing up importance data for each tag; an importance calculation step of calculating the importance of each tag/unit/section from the backed-up importance data; a yield prediction model training step of performing yield prediction model training by using the calculated importance of each tag; a yield prediction performing step of performing yield prediction through a yield prediction model trained in the yield prediction model training unit so as to output a yield prediction result; and a performance evaluation and optimal model selection step of evaluating the performance of the yield prediction model and selecting an optimal prediction model, by using the yield prediction result.

Here, in the importance calculation step, the importance of each unit/section is calculated based on the importance of each tag, wherein a unit is a mid-sized set of tags, a section is a large-size set of units, and a number of sections are put together to form a whole plant of an olefin production process.

Furthermore, based on the calculated variable importance (feature importance), the most important key factor is used as input into the prediction model, and unimportant data is excluded since it is deemed to be noise.

Furthermore, in the yield prediction model training step, yield prediction model training is performed, and a trained prediction model, model parameters, and model performance information are backed up, wherein outliers are removed, derived variables are generated, and the most important time-series data preprocessed and filtered through feature selection is updated weekly based on ML to generate an input mart.

Furthermore, the configured input mart is used to construct a yield forecasting model with high predictability by an ensemble of a time-series algorithm and a deep learning algorithm.

Furthermore, in the performance evaluation and optimal model selection step, part of the yield values backed up in the key factor extraction and individual tag importance backup step is not used in the model, but is kept in a blinded state and opened and compared when final performance evaluation is performed, so as to quantitatively evaluate prediction performance.

Furthermore, as a performance evaluation indicator, MAE (Mean Absolute Error), MAPE (Mean Absolute Percentage Error), and RMSE (Root Mean Square Error) are used.

Furthermore, the key factor extraction and individual tag importance backup step includes: a data extraction step of extracting tag data in units of a set period; an outlier discrimination step of discriminating and aggregating outliers by tag by using an outlier extraction reference master; an outlier processing step of generating an input mart draft excluding the outliers; a derived variable generation step of generating derived variables for each tag and generating an advanced input mart having the derived variable added thereto; a yield calculation step of backing up the result of calculation of a yield by realizing a target value via exclusion and correction of the outliers; and a key factor extraction step of extracting a yield key factor by calculating importance of each tag, and backs up importance data for each tag.

Furthermore, the outlier extraction reference master which is used in the outlier discrimination step to discriminate and aggregate outliers for each tag continuously updates reference values for extracting outliers over time in consistency with the concept of a machine learning-based system.

Furthermore, in the outlier discrimination step, a technique of using a statistical based sigma and a technique of filtering outliers using a quantile/quartile value are applied in order to select and exclude or correct outliers and then use only filtered values as input.

Furthermore, in the outlier processing step, an input mart is an input data frame that is to be inputted to train a prediction model.

Furthermore, in the derived variable generation step, outliers are not used directly after being filtered from raw data, but derived variables are generated based on time differences and statistics to avoid information loss from data.

The above-described system and method for predicting catalytic activity by using key factors in a commercial chemical process according to the present disclosure have the following advantageous effects.

First, key factors are selected according to process operating conditions and applied to a prediction model so that the prediction accuracy of a change in catalytic activity can be increased.

Second, it is possible to efficiently manage the time and cost of product production and catalyst replacement by allowing to determine a product sales plan and when to replace the catalyst through accurate catalytic activity prediction.

Third, it is possible to increase product yield by detecting a change in catalytic activity according to a process operation condition and improving catalytic activity through the optimization of the operation condition.

BRIEF DESCRIPTION OF THE DRAWINGS

FIG. 7 is a configuration diagram showing a prediction model evaluation method according to the present disclosure.

DETAILED DESCRIPTION

A system for predicting catalytic activity by using key factors in a commercial chemical process according to the present disclosure includes: a key factor extraction and individual tag importance backup unit that extracts yield key factors by calculating the importance of each tag, and backs up importance data for each tag; and a yield prediction model training and yield prediction performing unit that performs yield prediction model training by using the importance of each tag accumulated in the key factor extraction and individual tag importance backup unit, and performs yield prediction so as to output a yield prediction result, evaluates performance, and selects an optimal prediction model.

Hereinafter, a system and method for predicting catalytic activity by using key factors in a commercial chemical process according to exemplary embodiments of the present disclosure will be described below in detail.

The features and advantages of the system and method for predicting catalytic activity by using key factors in a commercial chemical process according to the present disclosure will be apparent from the following descriptions of the embodiments.

Figure 1:
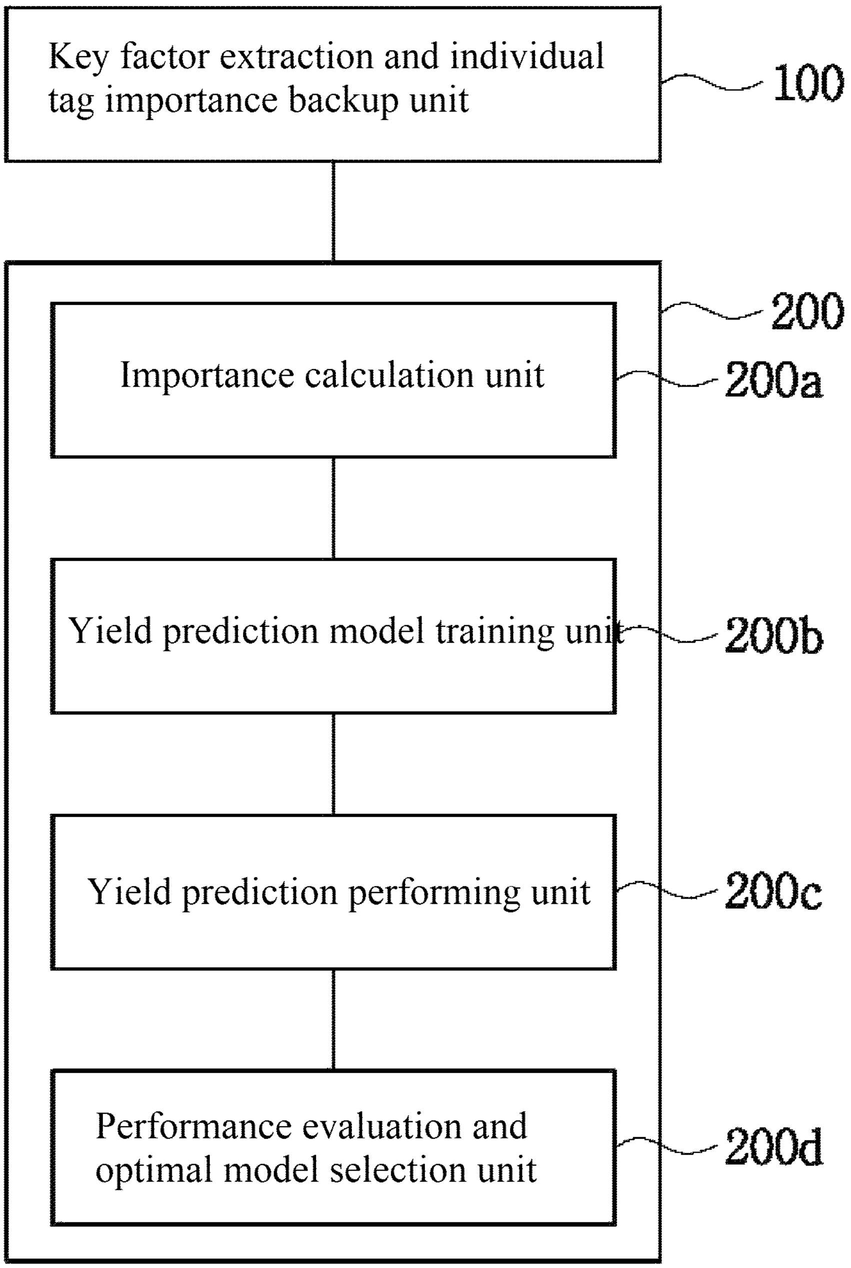
FIG. 1 is a block diagram of a system for predicting catalytic activity by using key factors in a commercial chemical process according to the present disclosure.

FIG. 1 is a block diagram of a system for predicting catalytic activity by using key factors in a commercial chemical process according to the present disclosure.

A system and method for predicting catalytic activity by using key factors in a commercial chemical process according to the present disclosure can increase the prediction accuracy of a change in catalytic activity by selecting key factors according to process operating conditions and applying them to a prediction model.

To this end, the present disclosure may include a component that extracts tag data in units of minutes/hours by using plant process operation data in an olefin production process, laboratory data, a plant event master, and past yield data.

The present disclosure may include a component that discriminates and aggregates outliers by tag by using an outlier extraction reference master and generates an input mart draft excluding the outliers.

The present disclosure may include a component that generates derived variables for each tag, generates an advanced input mart having the derived variable added thereto, and backs up the result of calculation of a yield by realizing a target value (yield) via exclusion and correction of the outliers.

The present disclosure may include a component that extracts a yield key factor by calculating importance of each tag and backs up importance data for each tag (variable).

The present disclosure may include a component that calculates the importance of each tag/unit/section from the backed-up importance data.

The present disclosure may include a component that performs yield prediction model training by using individual importance calculation results for each tag and backs up a trained prediction model, model parameters, and model performance information.

The present disclosure may include a component that performs yield prediction so as to output a yield prediction result, evaluates performance, and selects an optimal prediction model.

The following description has been given of a "factor related to catalytic activity" as an example of a "key factor affecting a process change", but is not limited thereto.

As shown in FIG. 1, a system for predicting catalytic activity by using key factors in a commercial chemical process according to the present disclosure includes: a key factor extraction and individual tag importance backup unit 100 that extracts yield key factors by calculating the importance of each tag, and backs up importance data for each tag; and a yield prediction model training and yield prediction performing unit 200 that performs yield prediction model training by using the importance of each tag accumulated in the key factor extraction and individual tag importance backup unit 100, and performs yield prediction so as to output a yield prediction result, evaluates performance, and selects an optimal prediction model.

Here, the yield prediction model training and yield prediction performing unit 200 includes an importance calculation unit 200*a* that calculates the importance of each tag/unit/section from the backed-up importance data, a yield prediction model training unit 200*b* that performs yield prediction model training by using the calculated importance of each tag, a yield prediction performing unit 200*c* that performs yield prediction through a yield prediction model trained in the yield prediction model training unit 200*b* so as to output a yield prediction result, and a performance evaluation and optimal model selection unit 200*d* that evaluates the performance of the yield prediction model and selects an optimal prediction model, by using the yield prediction result.

And, a detailed configuration of the key factor extraction and individual tag importance backup unit 100 is as follows.

Figure 2:
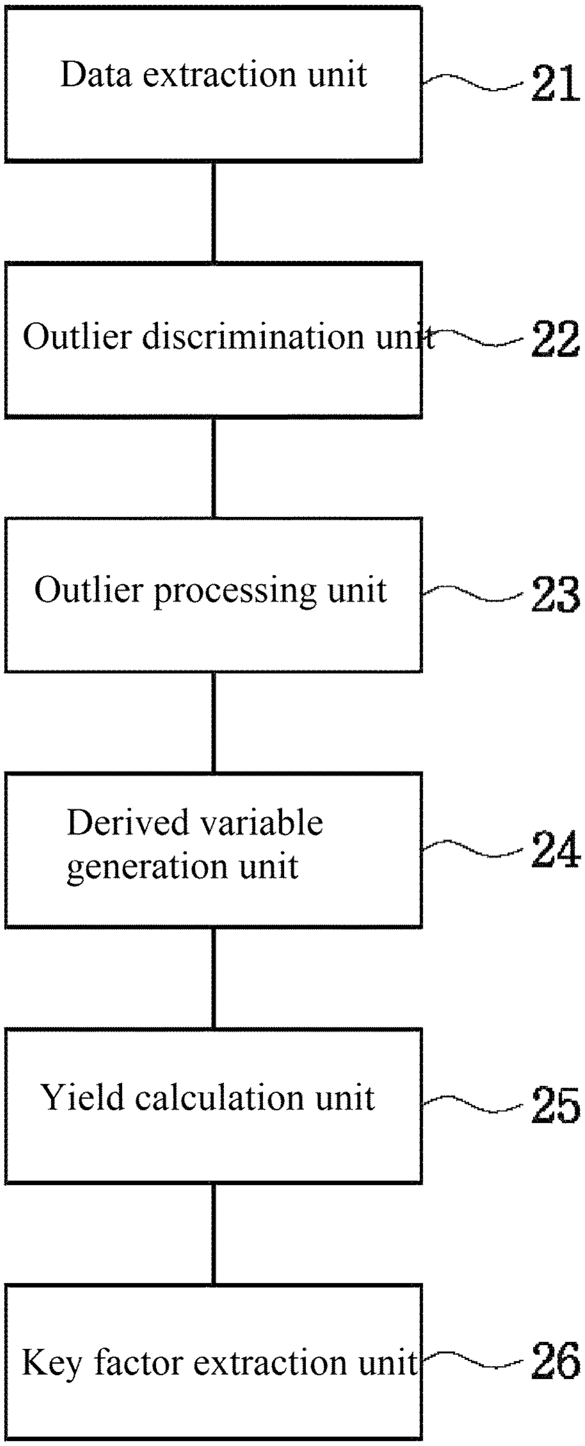
FIG. 2 is a detailed configuration diagram of the key factor extraction and individual tag importance backup unit.

FIG. 2 is a detailed configuration diagram of the key factor extraction and individual tag importance backup unit.

The key factor extraction and individual tag importance backup unit 100 includes a data extraction unit 21 that extracts tag data in units of minutes/hours by using plant process operation data in an olefin production process, laboratory data, a plant event master, and past yield data, an outlier discrimination unit 22 that discriminates and aggregates outliers by tag by using an outlier extraction reference master, an outlier processing unit 23 that generates an input mart draft excluding the outliers, a derived variable generation unit 24 that generates derived variables for each tag, and generates an advanced input mart having the derived variable added thereto, a yield calculation unit 25 that backs up the result of calculation of a yield by realizing a target value (yield) via exclusion and correction of the outliers, and a key factor extraction unit 26 that extracts a yield key factor by calculating importance of each tag, and backs up importance data for each tag (variable).

Here, data to be inputted into the data extraction unit 21 may be plant process operation data in an olefin production process, including data for each section, each unit, and each tag, laboratory data including LIMS (Laboratory Information Management System) data, plant event master data including a shut-down history, long integers/short integers, etc., and past yield data including conversion rates and selectivity.

The data to be inputted into the data extraction unit 21 is over 9,000 kinds of process tag (sensor) data in an olefin production process plant which is various kinds of temperature, pressure, flow, and composition data, for example, data accumulated continuously over the past five years from now in units of a set period.

Here, the units of a set period may be seconds or minutes, but not limited thereto. Also, it is needless to say that the data accumulation period may be a period of time other than five years.

And, the outlier extraction reference master which is used for the outlier discrimination unit 22 to discriminate and aggregate outliers for each tag continuously updates reference values for extracting outliers over time in consistency with the concept of a machine learning-based system.

As an example, updates may be done daily, weekly, or monthly, but not limited thereto.

A process for extracting a key factor according to the present disclosure will be described below in detail.

Figure 3:
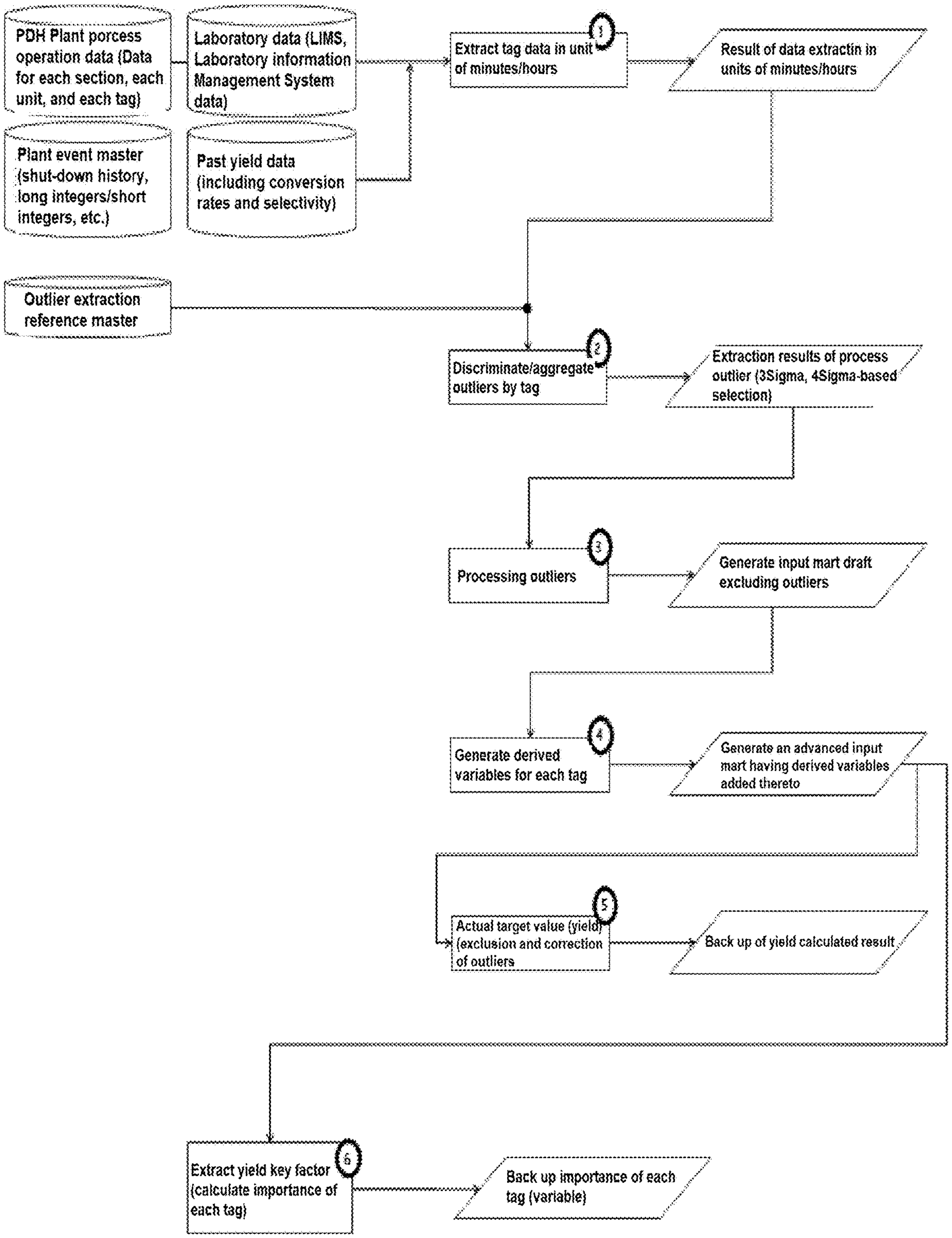
FIG. 3 is a flowchart showing a key factor extraction process according to the present disclosure.

FIG. 3 is a flowchart showing a key factor extraction process according to the present disclosure.

In the method for selecting a key factor affecting catalytic activity in a commercial chemical process according to the present disclosure, as shown in FIG. 3, ① a data extraction step is performed to extract tag data in units of minutes/hours by using plant process operation data in an olefin production process, laboratory data, a plant event master, and past yield data.

Subsequently, ② an outlier discrimination step is performed to discriminate and aggregate outliers by tag by using an outlier extraction reference master.

And, ③ an outlier processing step is performed to generate an input mart draft excluding the outliers.

Subsequently, ④ a derived variable generation step is performed to generate derived variables for each tag and generate an advanced input mart having the derived variable added thereto.

And, ⑤ a yield calculation step is performed to back up the result of calculation of a yield by realizing a target value (yield) via exclusion and correction of the outliers.

Subsequently, ⑥ a key factor extraction step is performed to extract a yield key factor by calculating importance of each tag and back up importance data for each tag (variable).

Here, in the data extraction step, over 9,000 kinds of sensor data (tag data) as SKA process data is accumulated every 30 seconds.

And, process, laboratory, and plant data is integrated/utilized for accurate yield prediction, and the data is converted in units of minutes or hours for analysis and stored in a data warehouse.

And, in the outlier discrimination step, outliers are selected and excluded or corrected, and then only filtered values are used as input, to which a technique of using a statistical based sigma and a technique of filtering outliers using a quantile/quartile value may be applied.

And, in the outlier processing step, an input mart is an input data frame (similar to a table format) that is to be inputted to train a prediction model.

And, in the derived variable generation step, outliers are not used directly after being filtered from raw data, but derived variables are generated based on time differences and statistics to make data abundant (to avoid information loss).

For example, over 9,000 kinds of data is extended laterally to several tens of thousands of dimensions. That is, the diversity of columns/variables is greatly extended.

A method for predicting catalytic activity by using key factors in a commercial chemical process according to the present disclosure will be described below in detail.

Figure 4:
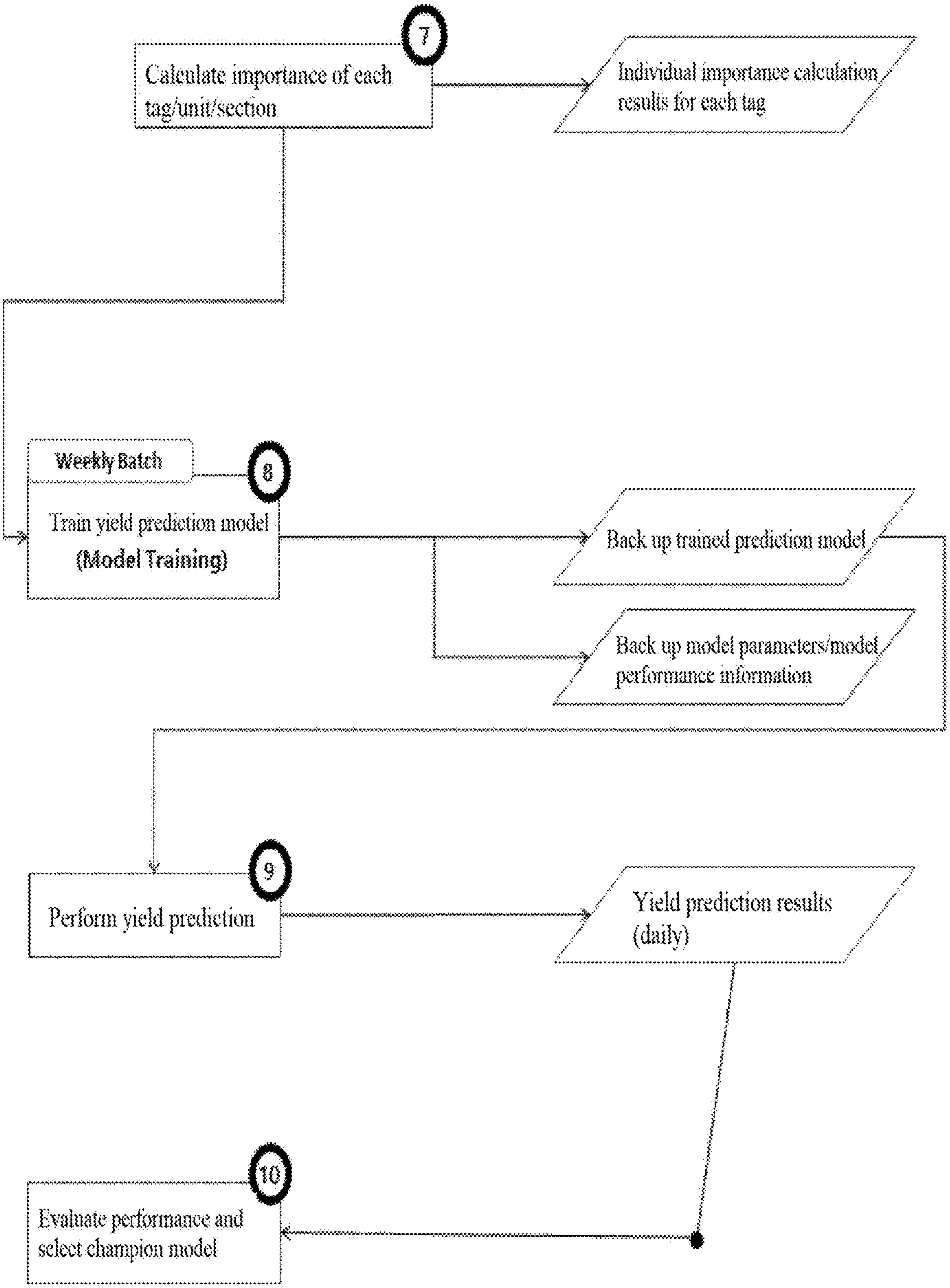
FIG. 4 is a flowchart of a method for predicting catalytic activity by using key factors in a commercial chemical process according to the present disclosure.

FIG. 4 is a flowchart of a method for predicting catalytic activity by using key factors in a commercial chemical process according to the present disclosure.

First, a key factor extraction and individual tag importance backup step is performed to extract yield key factors by calculating the importance of each tag and to back up importance data for each tag, and ⑦ the importance of each tag/unit/section is calculated from the backed-up importance data.

In this step, the importance of each tag is calculated to identify which variable most affects yield prediction and ups and downs in yield.

The importance of each unit/section is also calculated based on the importance of each tag, wherein a unit is a mid-sized set of tags, and a section is a large-size set of units. A number of sections are put together to form a whole plant of an olefin production process.

Based on the calculated variable importance (feature importance), the most important key factor is used as input into the prediction model, and unimportant data is excluded since it can be noise.

Subsequently, ⑧ yield prediction model training is performed by using the calculated importance of each tag, and a trained prediction model, model parameters, and model performance information are backed up.

In this step, outliers are removed, derived variables are generated, and the most important time-series data preprocessed and filtered through feature selection is updated weekly based on ML to generate an input mart and keep it up-to-date.

The input mart thus configured is used to construct a yield forecasting model with high predictability by an ensemble of a representative time-series algorithm and a latest deep learning algorithm.

Here, an ETS technique may be used as the time-series algorithm, and an LSTM technique may be used as the deep learning algorithm, but not limited thereto.

A result of the constructed yield forecasting model is Daily Yield Rate, which performs long-term prediction (12 months, 24 months, 36 months) as well as mid- to short-term prediction (upcoming 3 months, 6 months).

And, ⑨ yield prediction is performed to output a yield prediction result, and ⑩ performance is evaluated, and an optimal prediction model is selected.

Part of the yield values backed up in the step ⑤ is not used in the model, but is kept in a blinded state and opened and compared when final performance evaluation is performed, so as to quantitatively evaluate the excellence of prediction performance.

As a performance evaluation indicator, MAE (Mean Absolute Error), MAPE (Mean Absolute Percentage Error), and RMSE (Root Mean Square Error) may be used.

In this manner, once a key factor affecting catalytic activity in a commercial chemical process is selected, the key factor may be reflected so as to be applied to a constructed forecasting model (ML/DL-based yield forecasting) to predict catalytic activity.

Figure 5A:
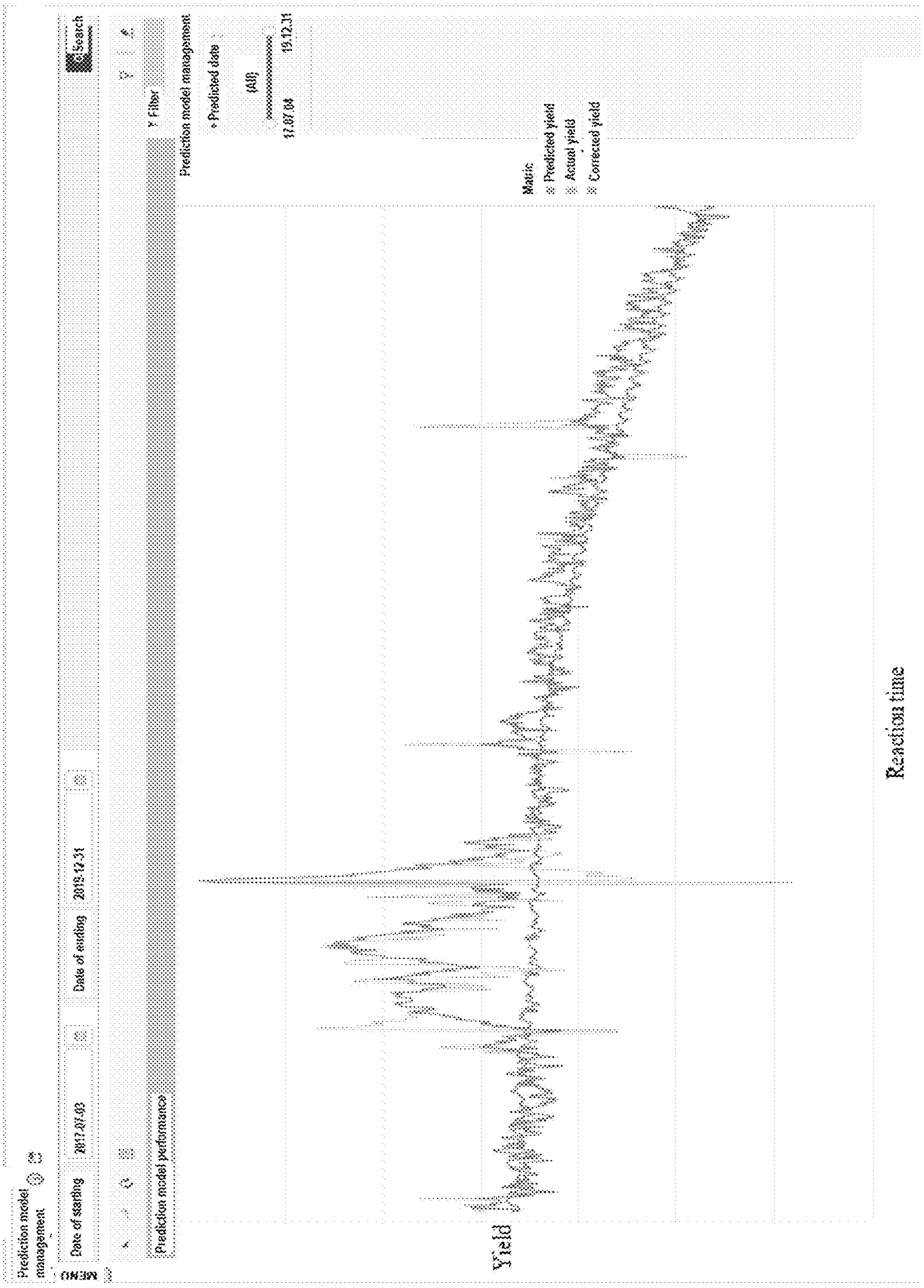
FIGS. 5*a* and 5*b* are output screen configuration diagrams showing an example of catalytic activity prediction results that reflect key factors in a commercial chemical process according to the present disclosure.
Figure 5B:
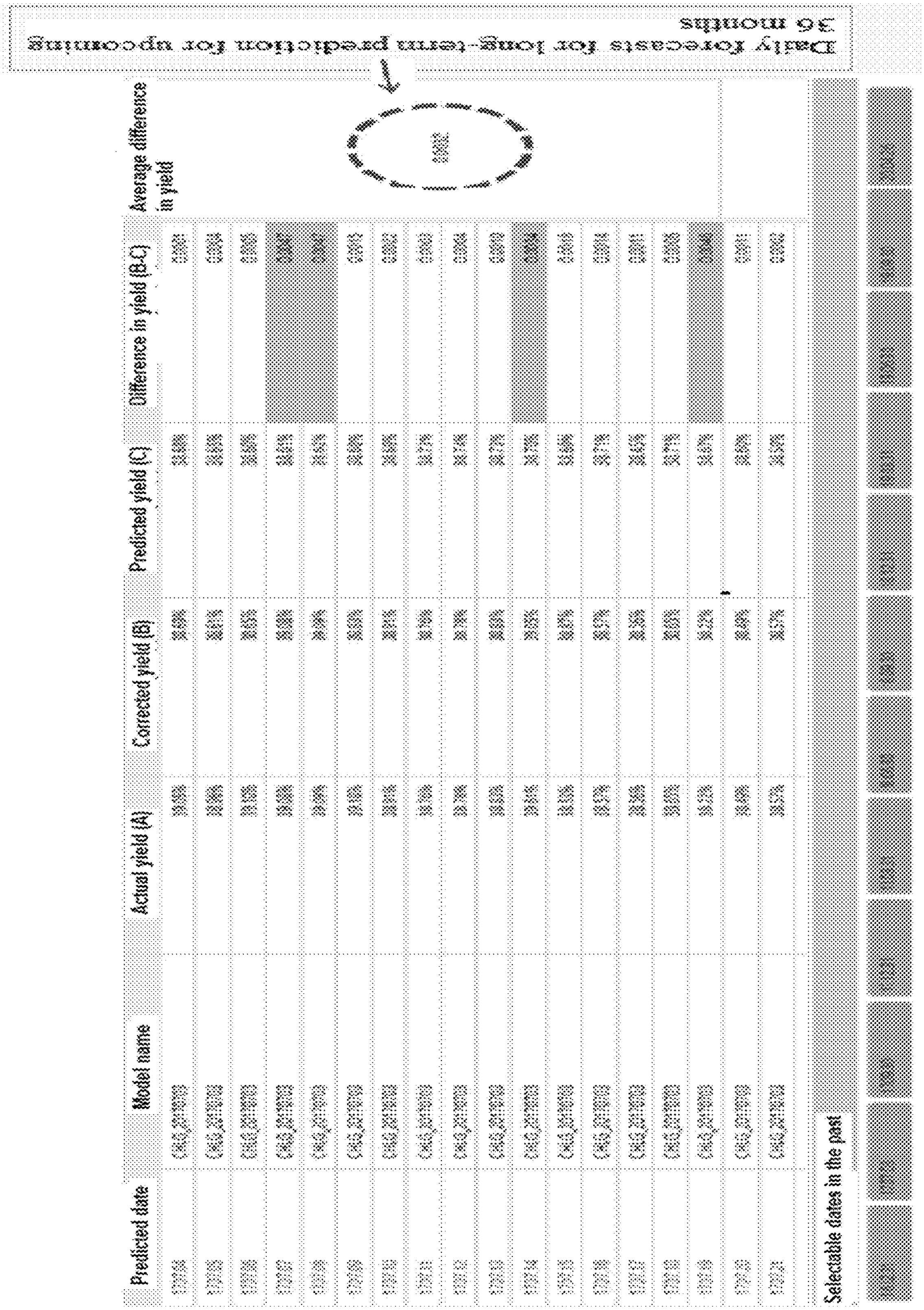

FIGS. 5*a* and 5*b* are output screen configuration diagrams showing an example of catalytic activity prediction results that reflect key factors in a commercial chemical process according to the present disclosure.

The concept of a prediction model in a system and method for predicting catalytic activity by using key factors in a commercial chemical process according to the present disclosure will be described below.

Figure 6:
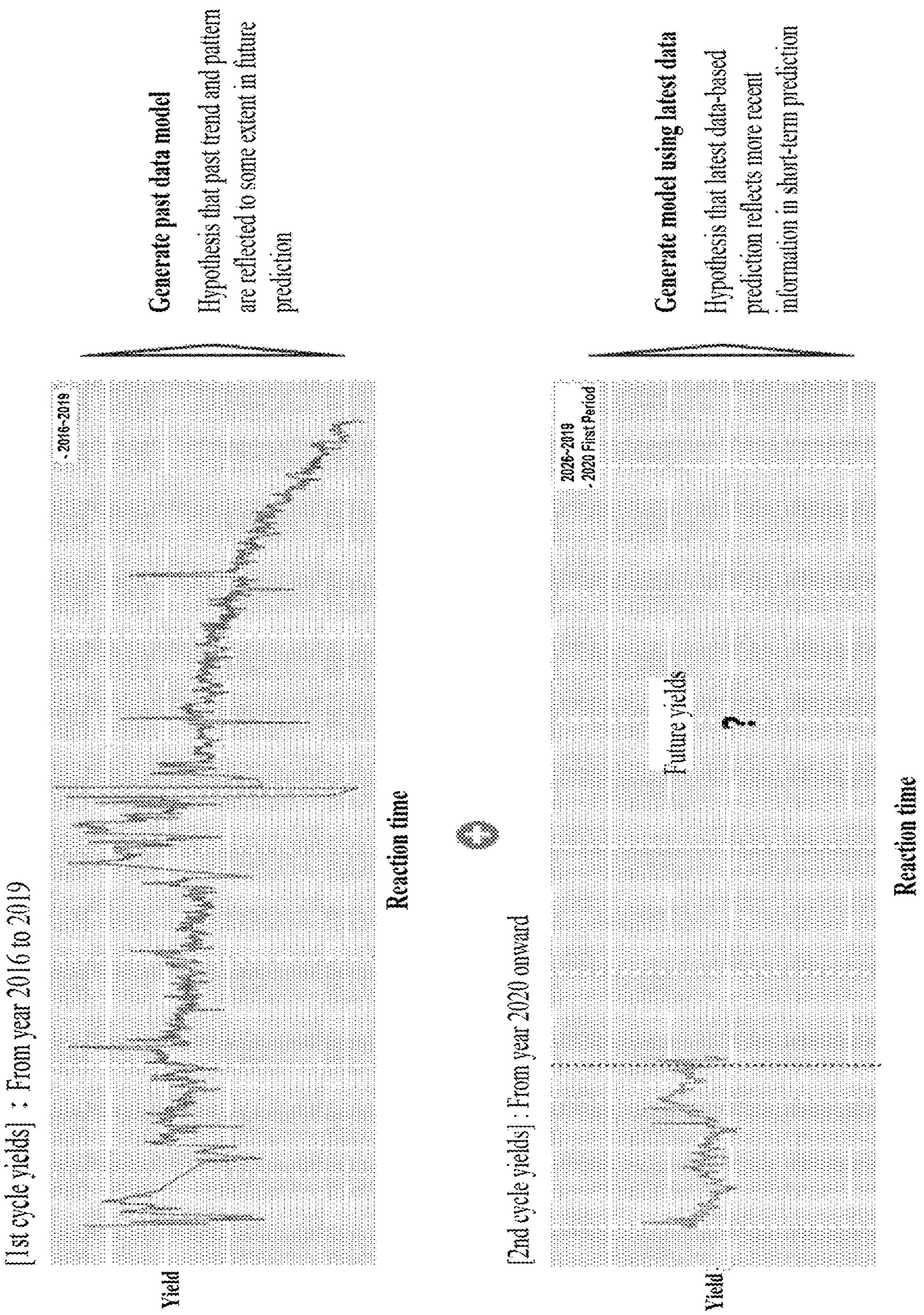
FIG. 6 is a configuration diagram of the concept of a prediction model according to the present disclosure.

FIG. 6 is a configuration diagram of the concept of a prediction model according to the present disclosure.

FIG. 6 shows a concept of developing a yield prediction model with tag information and yield information for a 1st cycle (from the year 2016 to 2019) and a concept of predicting a future yield by developing another model with information for a 2nd cycle (the year 2020) and then combining the model for the 1st cycle and the model for the 2nd cycle.

The applied modeling method will be described below.

As an applied time-series model, an exponential smoothing model, a traditional time-series model of an ARIMA (AutoRegressive Integrated Moving Average) model, and a LSTM (Long Short Term Memory) deep learning model may be considered.

In exponential smoothing, a weighted average is calculated by giving a higher weight to recent observations and a lower weight to past observations, and the weights are decreased exponentially (exponential decay) from the present to the past, and a number of observations are used as the weighted average, which creates a smoothing effect.

In the ARIMA (AutoRegressive Integrated Moving Average) model, a time-series is predicted by a moving average (calculation of an average by shifting observations) which takes into account Autoregressive (the quality of past values affecting recent values) and trend (Integrated).

The LSTM (Long Short Term Memory) deep learning model is a kind of RNN, which solves the problems of long-term dependencies (information from past times is not used) which has been a drawback of RNNs, and which processes new information by learning patterns from important information from the past.

It is desirable that, among these models, exponential smoothing is applied, which works well in representing a yield trend because of its advantage in predicting data with complex seasonality and a regular pattern, or the LSTM (Long Short Term Memory) deep learning model is applied, which recognizes important past information as a pattern and eliminates unnecessary information and therefore works well in representing a yield pattern by using every information that affects results, out of entire data.

FIG. 7 is a configuration diagram showing a prediction model evaluation method according to the present disclosure.

As a performance evaluation indicator, MAE (Mean Absolute Error), MAPE (Mean Absolute Percentage Error), and RMSE (Root Mean Square Error) may be used.

Figure 8:
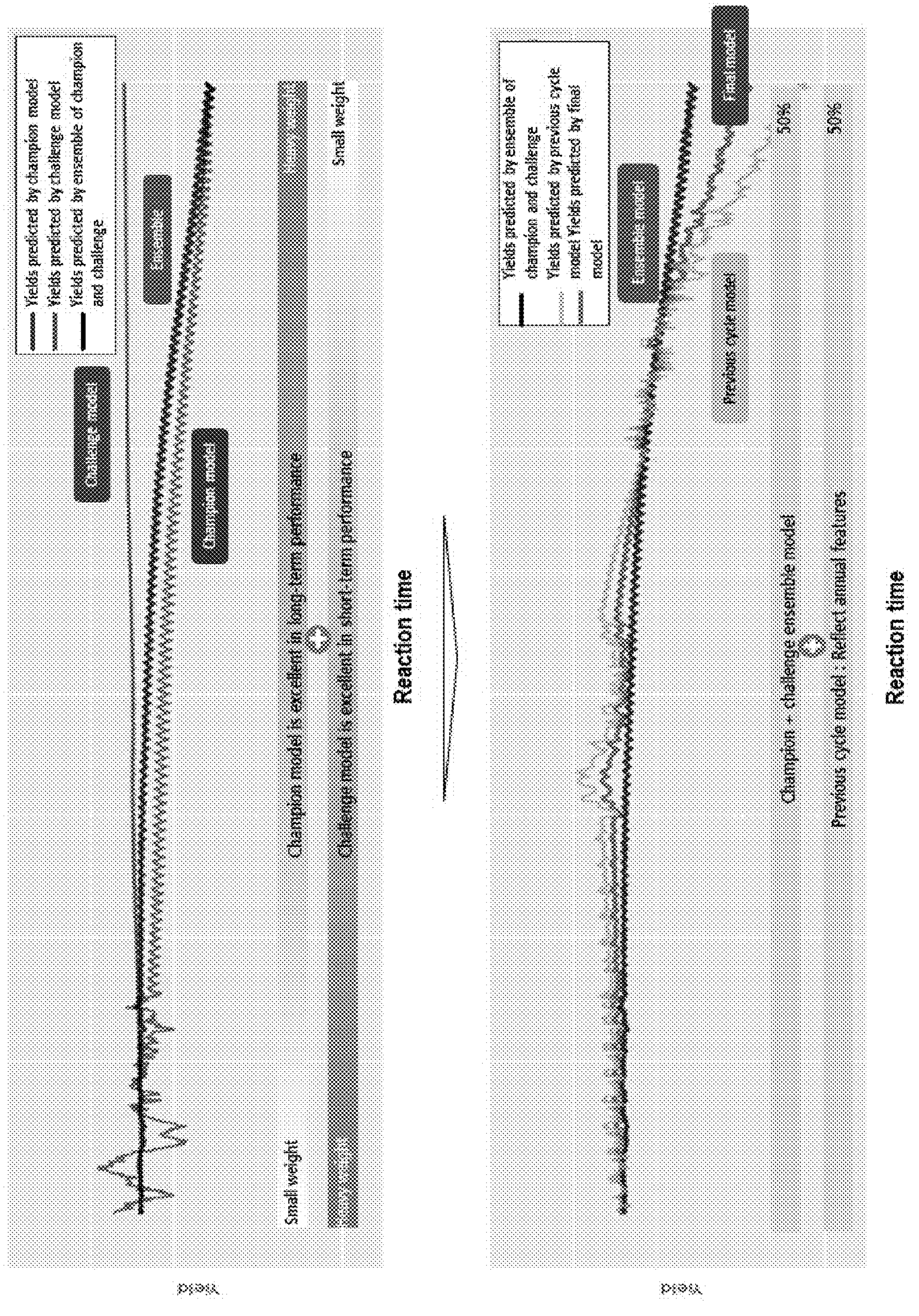
FIG. 8 is a configuration diagram showing an example of a prediction model ensemble method according to the present disclosure.
Figure 9A:
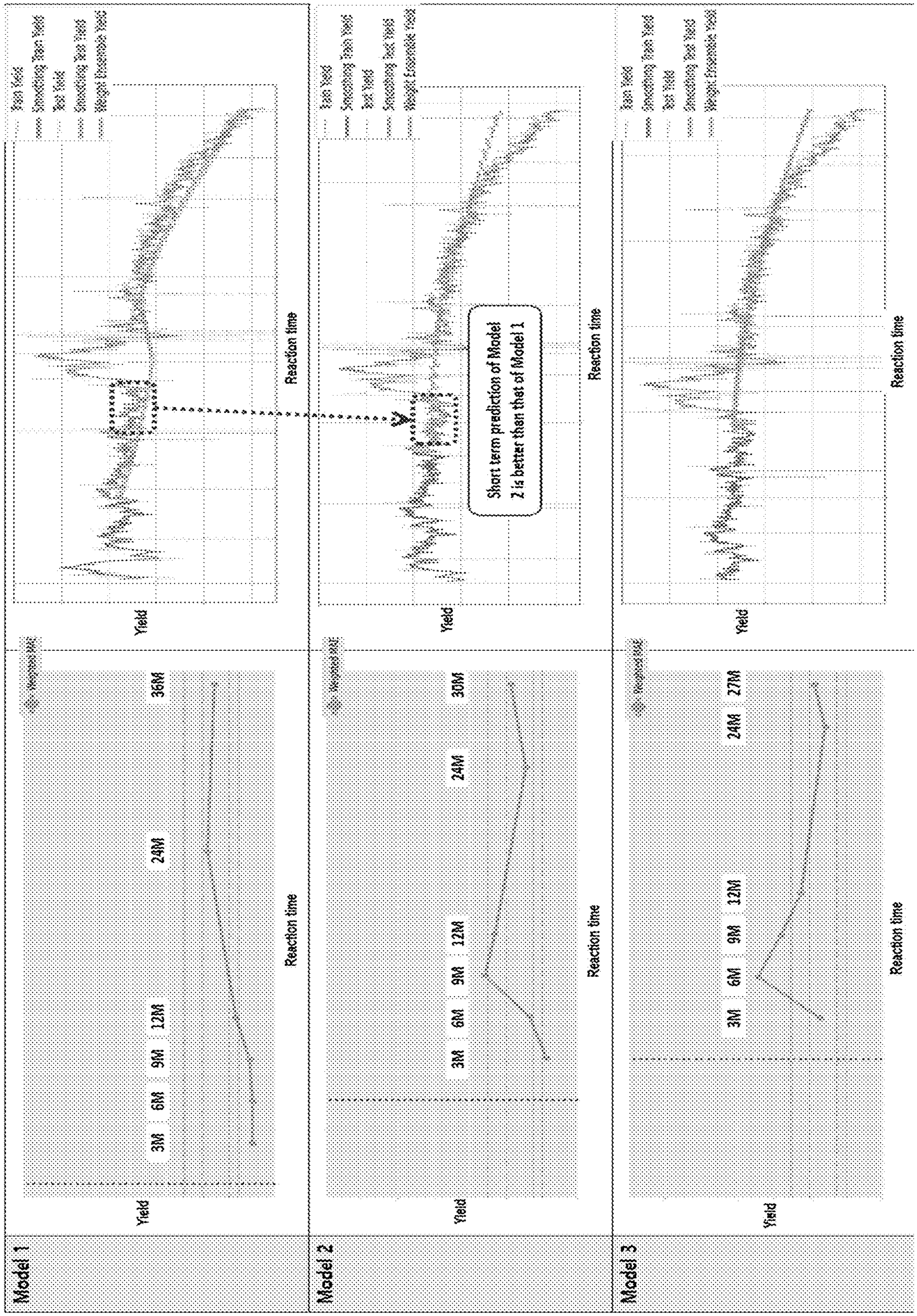
FIGS. 9*a* to 9*d* are graphs of prediction model performance check results for each period according to the present disclosure.
Figure 9B:
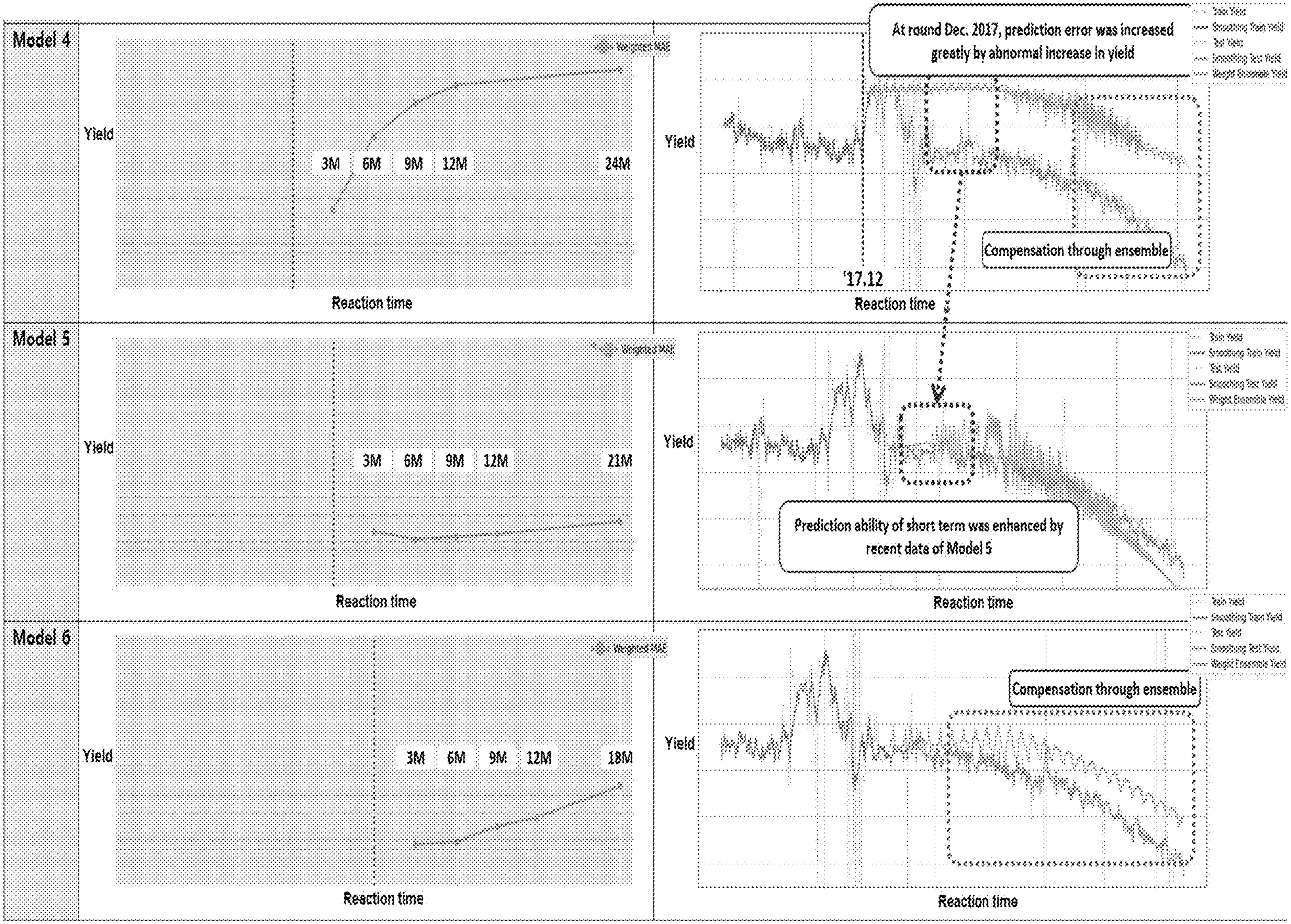
Figure 9C:
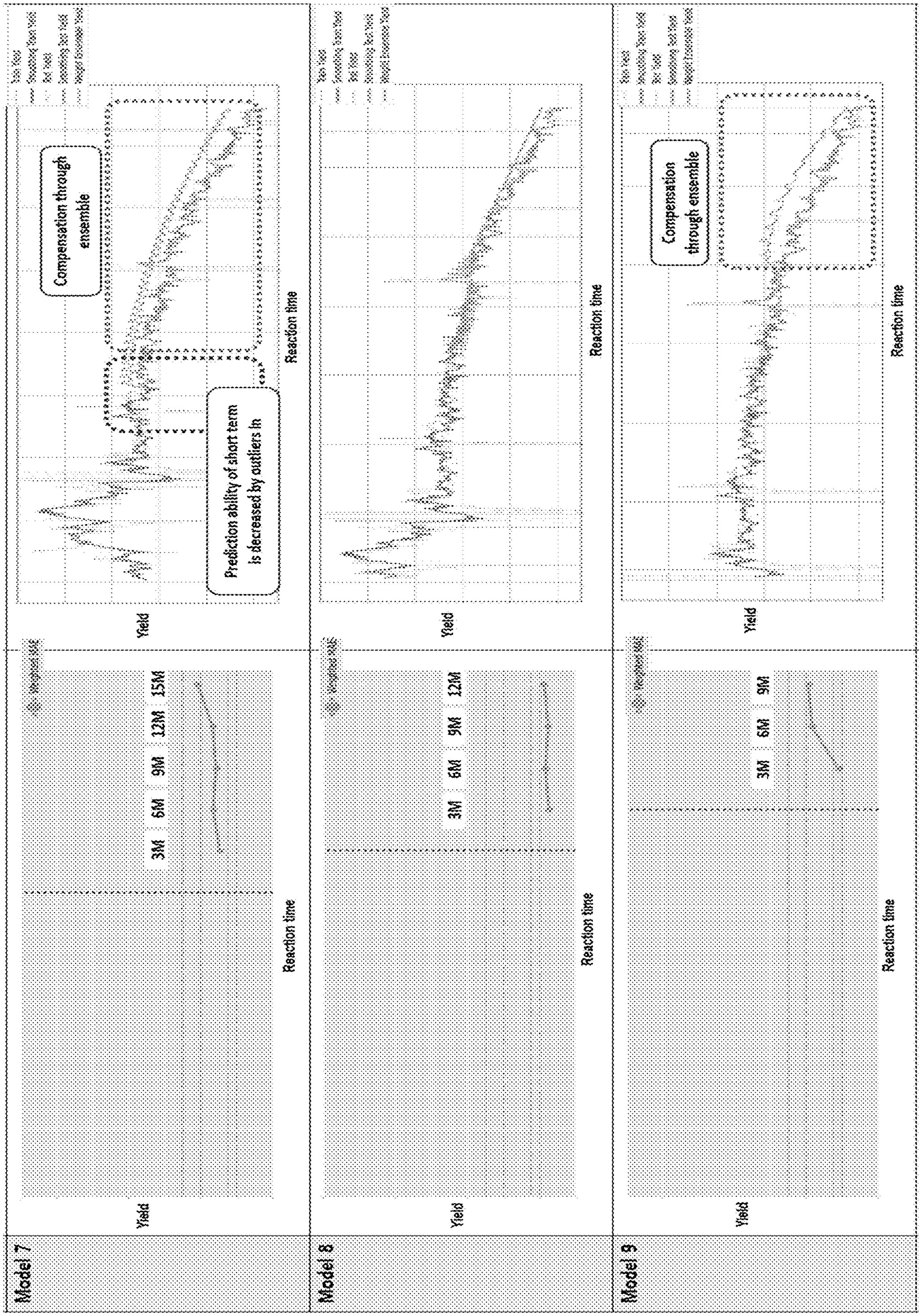
Figure 9D:
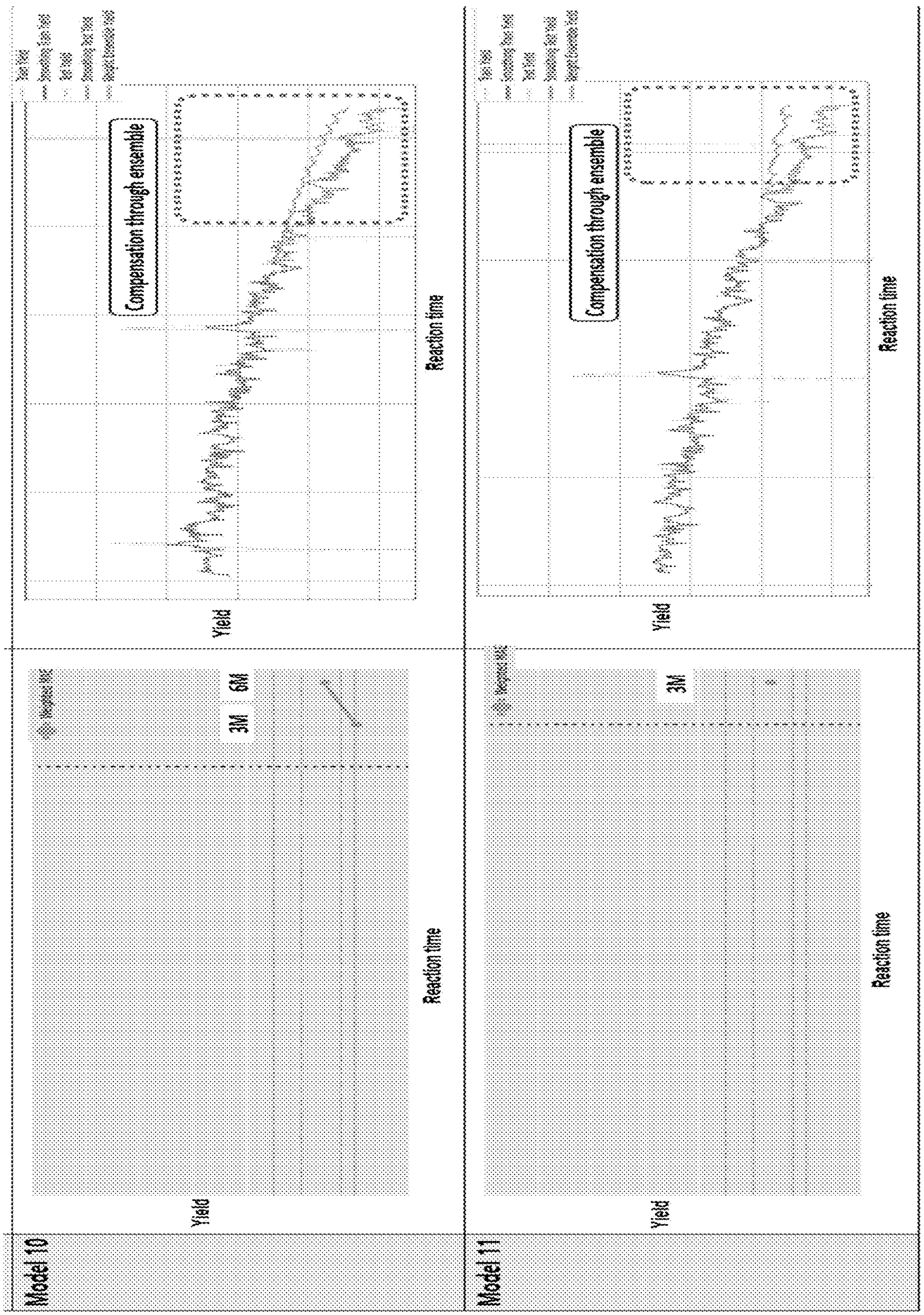
Figure 10A:
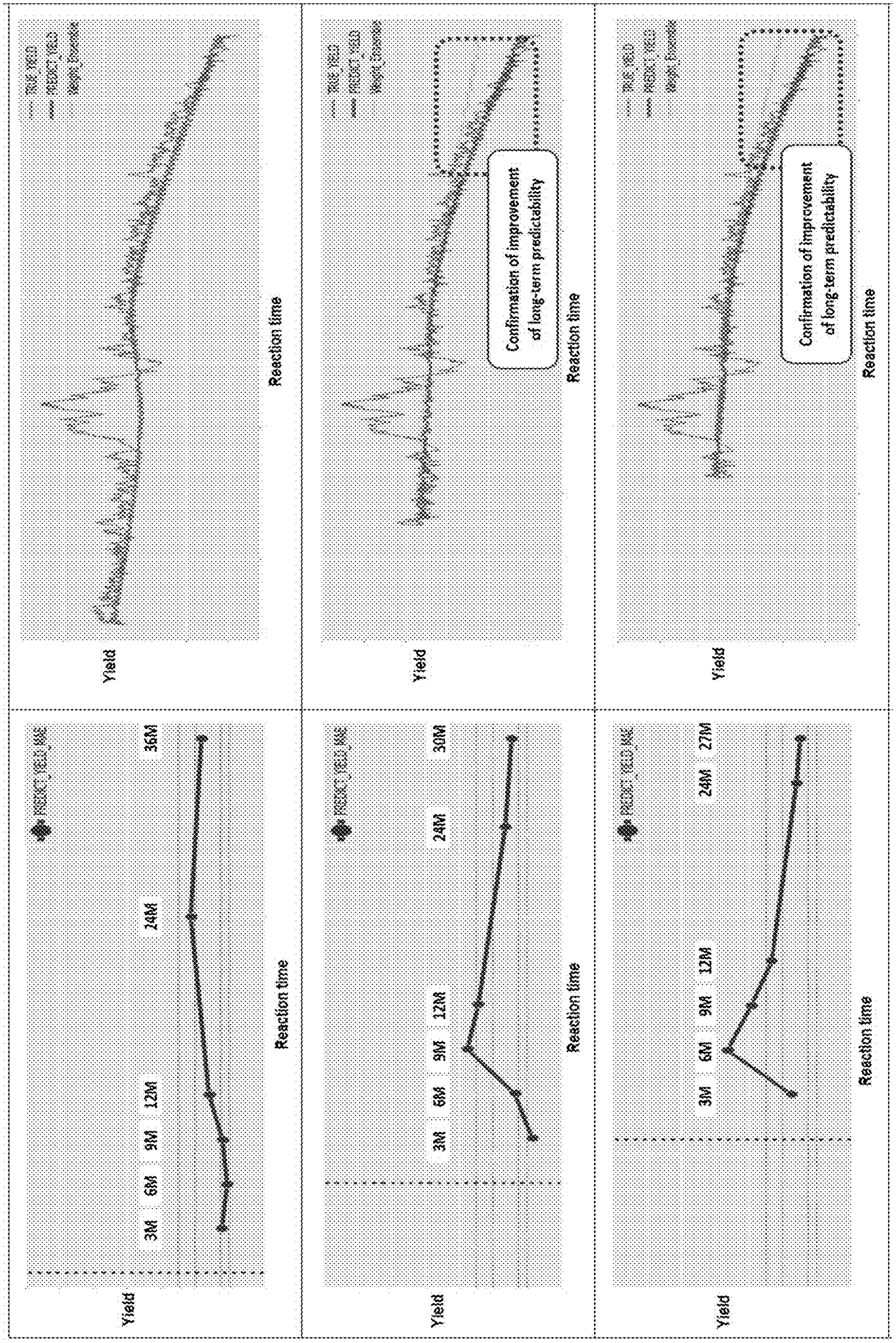
FIGS. 10*a* to 10*d* are graphs of ensemble model performance check results according to the present disclosure.
Figure 10B:
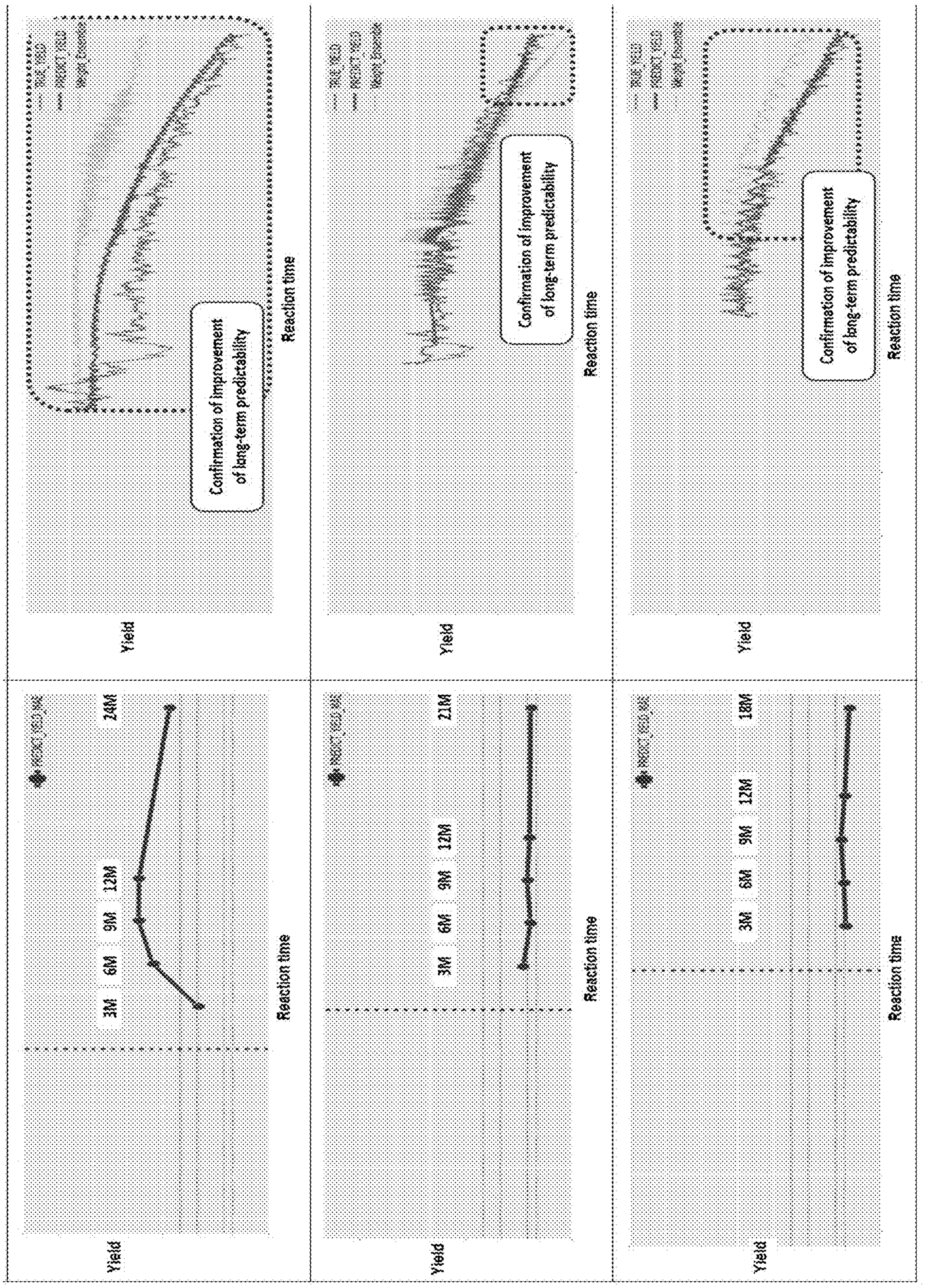
Figure 10C:
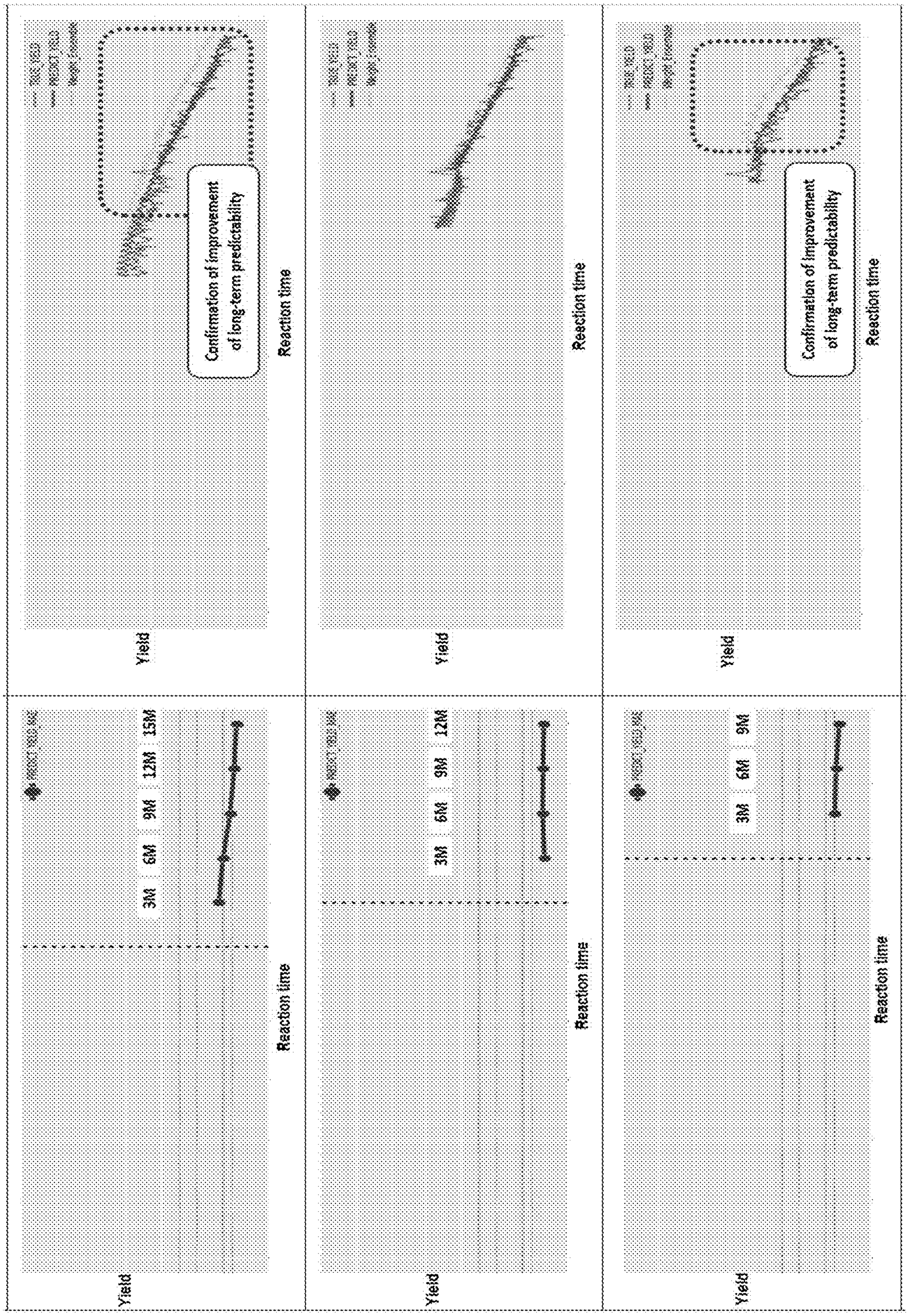
Figure 10D:
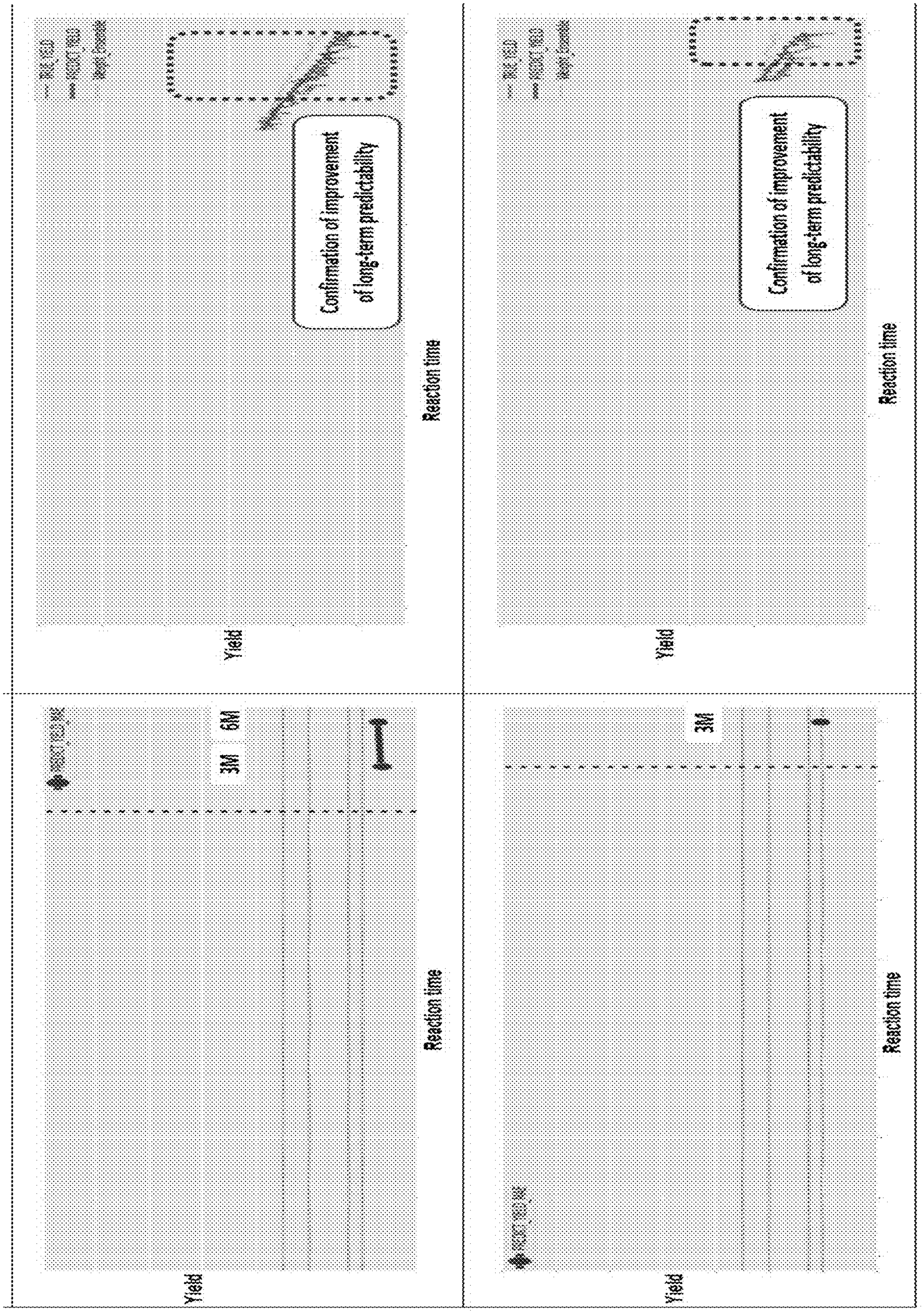

FIG. 8 is a configuration diagram showing an example of a prediction model ensemble method according to the present disclosure.

As an example, future yield predictability may be improved through a combination of champion (long-term prediction)+challenge (short-term prediction)+previous cycle model (reflecting annual features).

FIGS. 9*a* to 9*d* are graphs of prediction model performance check results for each period according to the present disclosure.

FIGS. 10*a* to 10*d* are graphs of ensemble model performance check results according to the present disclosure, which show error results for each interval (using an ensemble with the champion model) and entire prediction results (using an ensemble with the champion model).

As an example, prediction performance may be obtained by an ensemble of an initial model as the champion model and a model reflecting latest data as the challenge model.

To analyze the prediction performance of a final model, virtual yields for a 2nd cycle prediction model performance test may be generated, and final model performance may be measured by a virtual yield comparison with the final model.

Figure 11A:
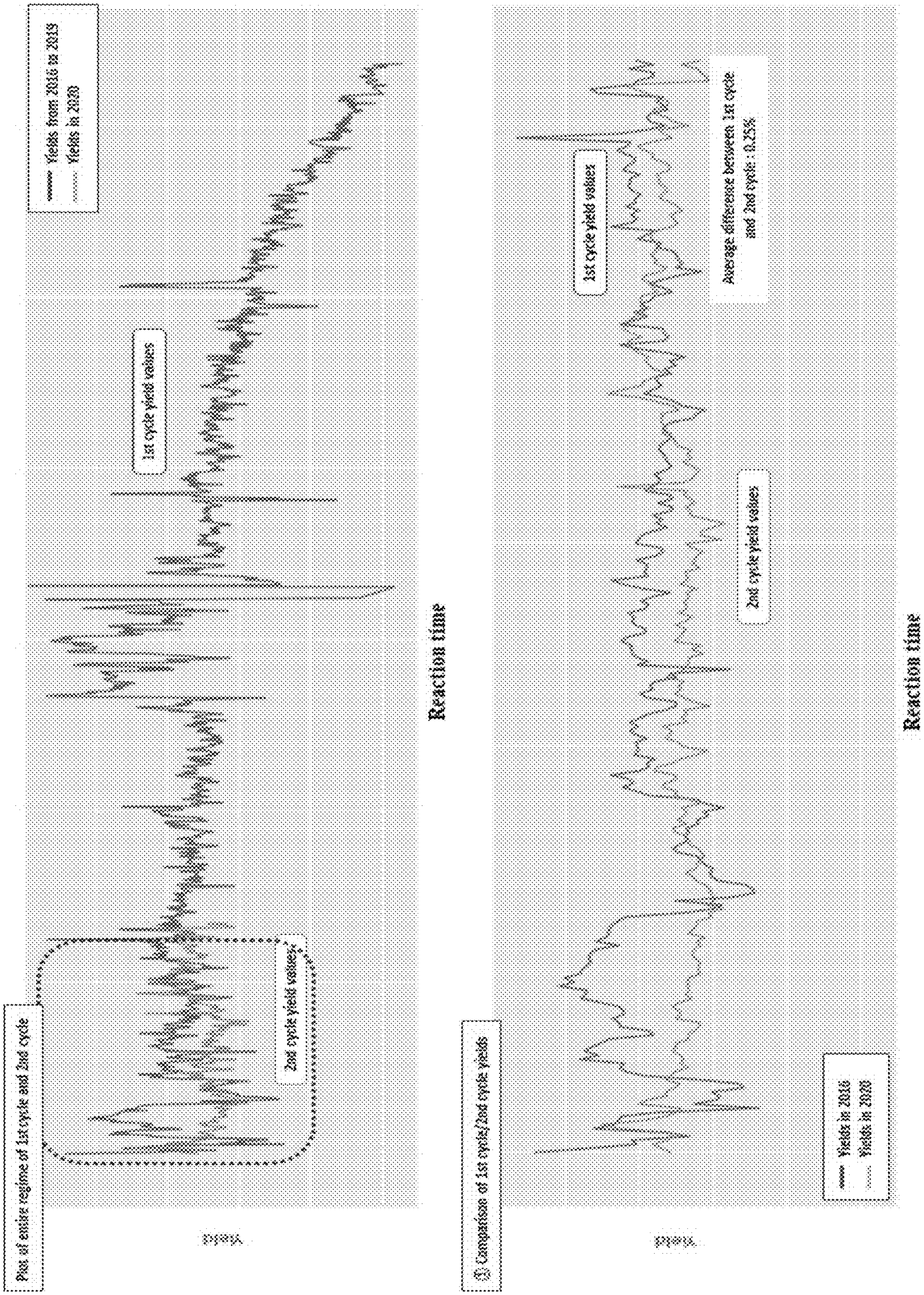
FIGS. 11*a* and 11*b* are result graphs of virtual yields for a 2nd cycle that are generated based on yield values for a 1st cycle.
Figure 11B:
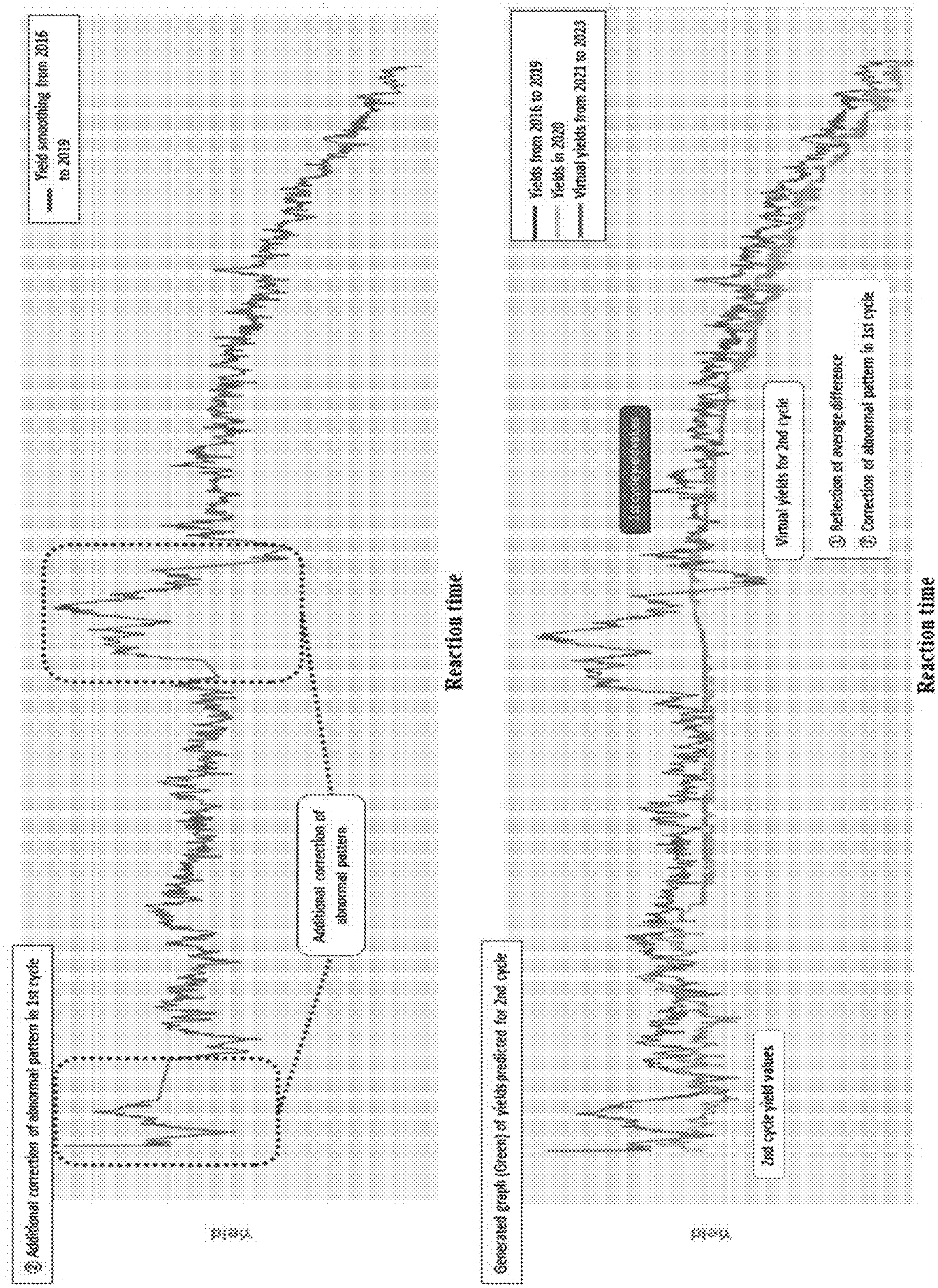

FIGS. 11*a* and 11*b* are result graphs of virtual yields for a 2nd cycle that are generated based on yield values for a 1st cycle, in which the average difference is checked by comparing the yields for the first year of the 1st cycle and the yields for the first year of the 2nd cycle, and an abnormal pattern in the 1st cycle is corrected.

Figure 12A:
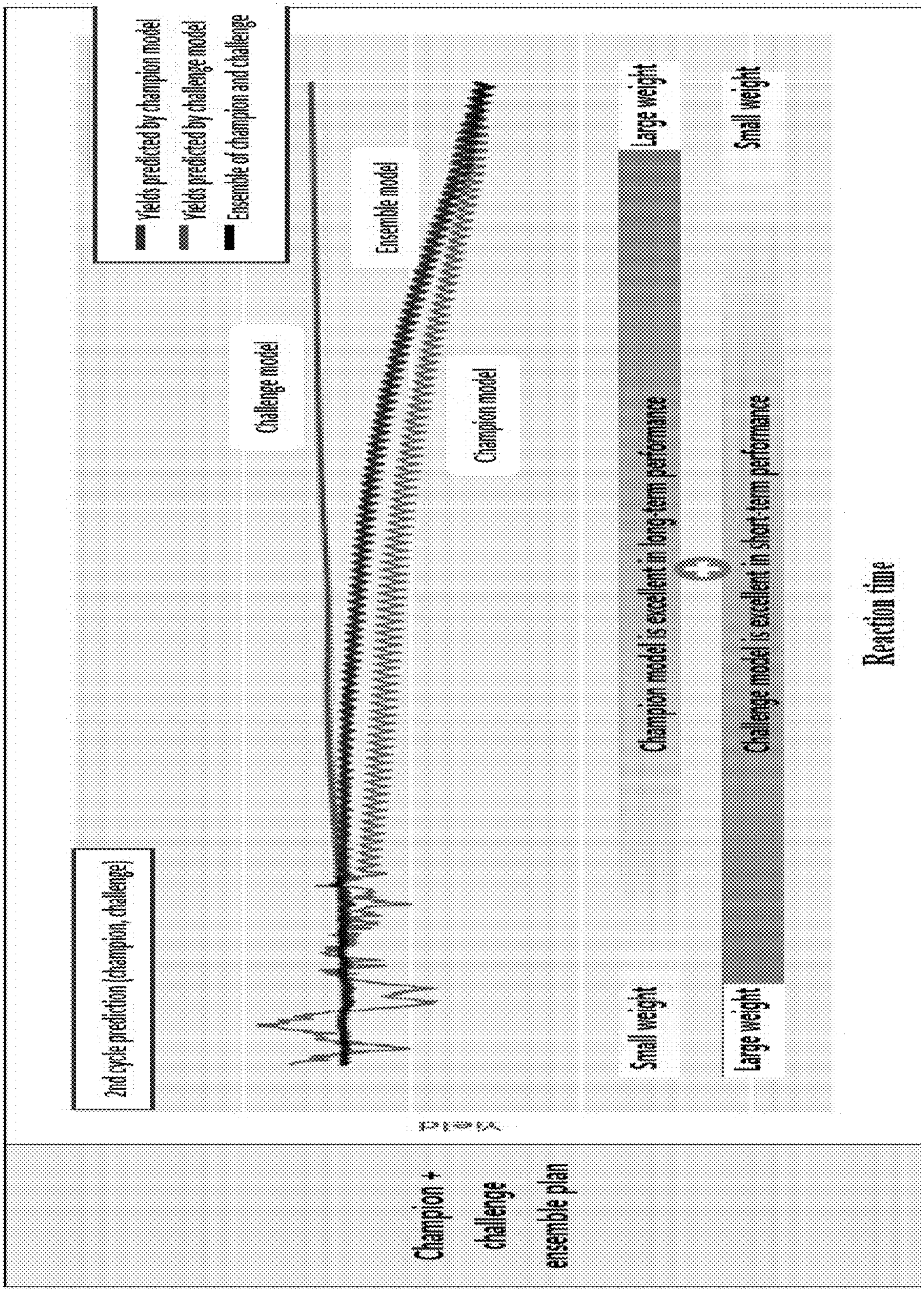
FIGS. 12*a* to 12*c* are graphs of 2nd cycle prediction results.
Figure 12B:
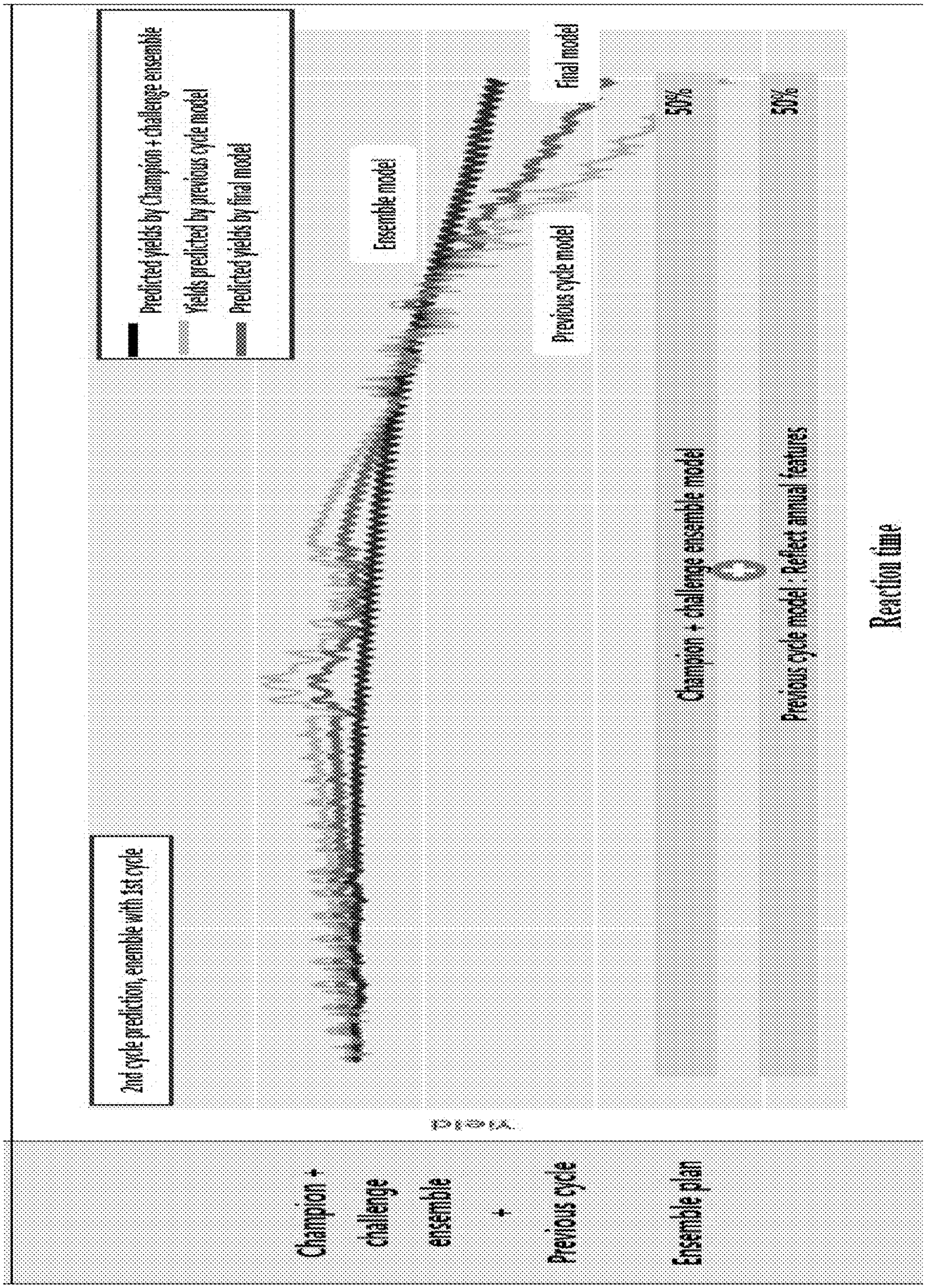
Figure 12C:
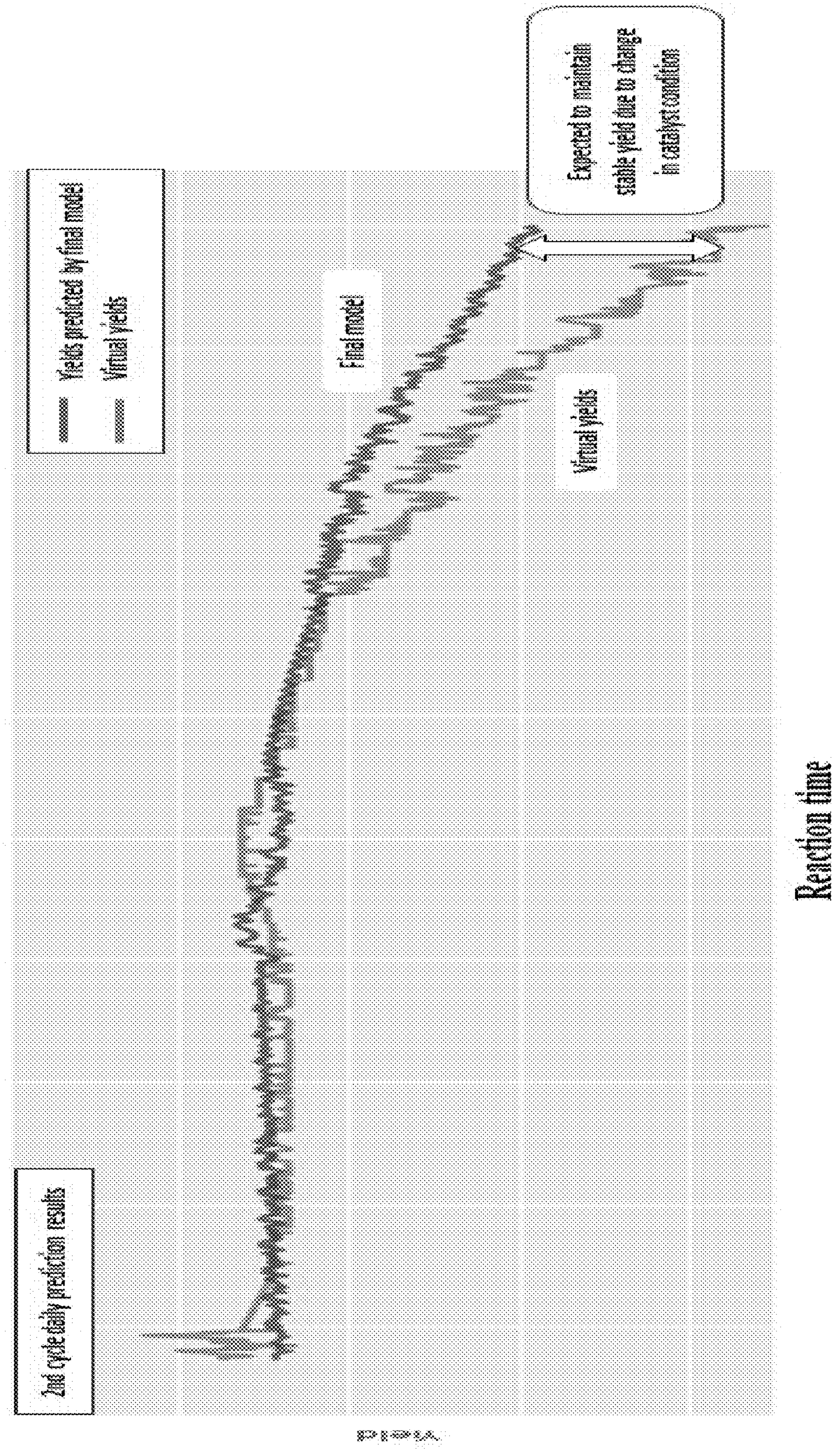

FIGS. 12*a* to 12*c* are graphs of 2nd cycle prediction results.

A first prediction is performed by an ensemble of a champion model (excellent in long-term prediction) and a challenge model (excellent in short-term prediction), and annual features are reflected by an ensemble with the 1st cycle model (PREC).

And, a future model performance virtual test is performed by comparing prediction results and virtual yields.

The above-described system and method for predicting catalytic activity by using key factors in a commercial chemical process according to the present disclosure can increase the prediction accuracy of a change in catalytic activity by selecting key factors according to process operating conditions and applying them to a prediction model.

This helps efficiently manage the time and cost of product production and catalyst replacement by allowing to determine a product sales plan and when to replace the catalyst through accurate catalytic activity prediction, and also can increase product yield by detecting a change in catalytic activity according to a process operation condition and improving catalytic activity through the optimization of the operation condition.

It will be understood by those skilled in the art to which the present disclosure belongs that the present disclosure may be implemented in modified forms without departing from the essential characteristics of the present disclosure.

Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

EXPLANATION OF REFERENCE NUMERALS

100: Key factor extraction and individual tag importance backup unit
200*a*: Importance calculation unit
200*b*: Yield prediction model training unit
200*c*: Yield prediction performing unit
200*d*: Optimal model selection unit The present disclosure relates to process change prediction, and more particularly, to a system and method for predicting catalytic activity by using key factors in a commercial chemical process, wherein key factors are selected according to process operating conditions and applied to a prediction model so that the prediction accuracy of a change in catalytic activity can be increased.

The invention claimed is:

1. A system for predicting process changes by using key factors in a commercial chemical process, the system comprising:

a key factor extraction and individual tag importance backup unit that extracts yield key factors by calculating the importance of each tag, and backs up importance data for each tag; and a yield prediction model training and yield prediction performing unit that performs yield prediction model training by using the importance of each tag accumulated in the key factor extraction and individual tag importance backup unit, and performs yield prediction so as to output a yield prediction result, evaluates performance, and selects an optimal prediction model, wherein the yield prediction model training and yield prediction performing unit is further configured to designate the optimal prediction model as a champion model, iteratively retrain a challenge model using the importance of each tag accumulated in the key factor extraction and individual tag importance backup unit together with newly accumulated process data on a set schedule, evaluate the challenge model against the champion model, generate the yield prediction result as a weighted ensemble of the champion model and the challenge model, and replace the champion model with the challenge model upon the challenge model achieving a lower prediction error than the champion model, and wherein the key factor extraction and individual tag importance backup unit and the yield prediction model training and yield prediction performing unit are each implemented via at least one processor.

2. The system of claim 1, wherein the yield prediction model training and yield prediction performing unit includes:

an importance calculation unit that calculates the importance of each tag, unit, and section from the importance data backed up in the key factor extraction and individual tag importance backup unit;

a yield prediction model training unit that performs yield prediction model training by using the calculated importance of each tag;

a yield prediction performing unit that performs yield prediction through a yield prediction model trained in the yield prediction model training unit so as to output a yield prediction result; and a performance evaluation and optimal model selection unit that evaluates the performance of the yield prediction model and selects an optimal prediction model, by using the yield prediction result, wherein the importance calculation unit, the yield prediction model training unit, the yield prediction performing unit, and the performance evaluation and optimal model selection unit are each implemented via at least one processor.

3. The system of claim 1, wherein the key factor extraction and individual tag importance backup unit includes:

a data extraction unit that extracts tag data in units of a set period;

an outlier discrimination unit that discriminates and aggregates outliers by tag by using an outlier extraction reference master;

an outlier processing unit that generates an input mart draft excluding the outliers;

a derived variable generation unit that generates derived variables for each tag, and generates an advanced input mart having the derived variable added thereto;

a yield calculation unit that backs up the result of calculation of a yield by realizing a target value via exclusion and correction of the outliers; and a key factor extraction unit that extracts a yield key factor by calculating importance of each tag, and backs up importance data for each tag, wherein the data extraction unit, the outlier discrimination unit, the outlier processing unit, the derived variable generation unit, the yield calculation unit, and the key factor extraction unit are each implemented via at least one processor.

4. The system of claim 3, wherein data to be inputted into the data extraction unit includes:

plant process operation data in an olefin production process, including data for each section, each unit, and each tag;

laboratory data including Laboratory Information Management System (LIMS) data and plant event master data including a shut-down history; and past yield data including conversion rates and selectivity.

5. The system of claim 4, wherein the plant process operation data in the olefin production process is sensor data including temperature, pressure, flow, and composition data, and past data accumulated continuously over a unit period of time.

6. The system of claim 3, wherein the outlier extraction reference master continuously updates reference values for extracting outliers based on newly accumulated tag data.

7. A method for predicting process changes by using key factors in a commercial chemical process, the method comprising:

a key factor extraction and individual tag importance backup step of extracting yield key factors by calculating the importance of each tag, and backing up importance data for each tag;

an importance calculation step of calculating the importance of each tag, unit, and section from the backed-up importance data;

a yield prediction model training step of performing yield prediction model training by using the calculated importance of each tag;

a yield prediction performing step of performing yield prediction through a yield prediction model trained in the yield prediction model training step so as to output a yield prediction result; and a performance evaluation and optimal model selection step of evaluating the performance of the yield prediction model and selecting an optimal prediction model, by using the yield prediction result, wherein the method further comprises designating the optimal prediction model as a champion model, iteratively retraining a challenge model using the calculated importance of each tag together with newly accumulated process data on a set schedule, evaluating the challenge model against the champion model, generating the yield prediction result as a weighted ensemble of the champion model and the challenge model, and replacing the champion model with the challenge model upon the challenge model achieving a lower prediction error than the champion model.

8. The method of claim 7, wherein, in the importance calculation step, the importance of each unit and section is calculated based on the importance of each tag, wherein a unit is a set of tags, a section is a set of units, and a number of sections are put together to form a whole plant of an olefin production process.

9. The method of claim 8, wherein, based on the calculated importance, the most important key factor is used as input into the prediction model, and data having a feature importance value below a calculated importance threshold is excluded from input to the prediction model.

10. The method of claim 7, wherein, in the yield prediction model training step, yield prediction model training is performed, and a trained prediction model, model parameters, and model performance information are backed up, wherein outliers are removed, derived variables are generated, and the most important time-series data preprocessed and filtered through feature selection is updated weekly based on ML to generate the input mart.

11. The method of claim 10, wherein the input mart is used to construct a yield forecasting model by an ensemble of a time-series algorithm and a deep learning algorithm.

12. The method of claim 7, wherein, in the performance evaluation and optimal model selection step, part of yield values backed up in the key factor extraction and individual tag importance backup step is not used in the model, but is kept in a blinded state and opened and compared when final performance evaluation is performed, so as to quantitatively evaluate prediction performance.

13. The method of claim 12, wherein, as a performance evaluation indicator, Mean Absolute Error (MAE), Mean Absolute Percentage Error (MAPE), and Root Mean Square Error (RMSE) are used.

14. The method of claim 7, wherein the key factor extraction and individual tag importance backup step includes:

a data extraction step of extracting tag data in units of a set period;

an outlier discrimination step of discriminating and aggregating outliers by tag by using an outlier extraction reference master;

an outlier processing step of generating an input mart draft excluding the outliers;

a derived variable generation step of generating derived variables for each tag and generating an advanced input mart having the derived variable added thereto;

a yield calculation step of backing up the result of calculation of a yield by realizing a target value via exclusion and correction of the outliers; and a key factor extraction step of extracting a yield key factor by calculating importance of each tag, and backing up importance data for each tag.

15. The method of claim 14, wherein the outlier extraction reference master continuously updates reference values for extracting outliers based on newly accumulated tag data.

16. The method of claim 15, wherein, in the outlier discrimination step, a technique of using a statistical based sigma and a technique of filtering outliers using a quantile value are applied in order to select and exclude or correct outliers and then use only filtered values as input.

17. The method of claim 14, wherein, in the outlier processing step, an input mart is an input data frame that is to be inputted to train a prediction model.

18. The method of claim 14, wherein, in the derived variable generation step, outliers are not used directly after being filtered from raw data, but derived variables are generated based on time differences and statistics.

* * * * *